US006209041B1

(12) United States Patent
Shaw et al.

(10) Patent No.: US 6,209,041 B1
(45) Date of Patent: **\*Mar. 27, 2001**

(54) METHOD AND COMPUTER PROGRAM PRODUCT FOR REDUCING INTER-BUFFER DATA TRANSFERS BETWEEN SEPARATE PROCESSING COMPONENTS

(75) Inventors: George H. J. Shaw, Woodinville; Bryan A. Woodruff, North Bend, both of WA (US); Thomas J. O'Rourke, Oulu (FI)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/825,957

(22) Filed: Apr. 4, 1997

(51) Int. Cl.[7] .............................. G06F 9/54; G06F 15/17; G06F 15/167

(52) U.S. Cl. ......................................................... 709/321

(58) Field of Search ................................. 709/301, 321, 709/322, 323, 324, 325, 326, 327

(56) References Cited

U.S. PATENT DOCUMENTS 5,675,793 * 10/1997 Crick et al. ........................... 395/651
5,768,126 * 6/1998 Frederick ........................ 364/400.01

OTHER PUBLICATIONS (Custer) Custer, Helen. Inside Windows NT "The I/O System" Chapter 7, 1992, pp. 325–361, 1992.*
(Gupta) Gupta, Sandeep et al. "Cues: File Subsystem Data Streams", May 30, 1996.*
(Jones) Jones, Mitt. Driver's ed. (Win 32 Driver Model), Oct. 1997.*
(Computergram) Computergram International. "New Tool from Vireo Software is the First to Automate Device Driver Design for Windows NT", Mar. 12, 1997.*
Coulson, Geoff et al.. "Supporting Continuous Media Applications in a Micro–Kernel Environment", 1994.*

* cited by examiner

Primary Examiner—Majid Banankhah
Assistant Examiner—Lewis A. Bullock, Jr.
(74) Attorney, Agent, or Firm—Workman, Nydegger & Seeley

(57) ABSTRACT

A method and computer program product for overcoming the inefficiencies associated with inter-buffer data transfers between separate processing components such as kernel mode drivers that are chained together. Provided is a standard mechanism for allocating and managing data buffers needed for processing data in a system, wherein multiple drivers are chained together using a standardized connection method in the connection pin instances. Drivers having different buffer requirements and capabilities may be queried and matched for easy data transition between the chained drivers requiring the least number of buffers and, hence the least expensive yet most efficient inter-buffer data transfer. Examples of buffer requirements include previous frame storage for adaptive processing, byte alignment, frame size, outstanding frames allowed, etc. The buffer requirements of an input connection pin instance may be queried by an application initializing the chained drivers. When a buffer is needed, a buffer allocator will be associated with the input pin instance, otherwise a driver will process the data in the previous existing buffer.

12 Claims, 13 Drawing Sheets

METHOD AND COMPUTER PROGRAM PRODUCT FOR REDUCING INTER-BUFFER DATA TRANSFERS BETWEEN SEPARATE PROCESSING COMPONENTS

BACKGROUND THE INVENTION

1. The Field of the Invention

The field of the present invention is computer software driver development. The present invention relates to tools, software frameworks, conventions, etc. to simplify code generation of drivers and provide standardized access points. More specifically, the present invention is directed to methods and computer program products for managing buffers used by multiple entities, such as interconnected software drivers, so that a minimum amount of inter-buffer data transfer occurs between entities during processing by software drivers running in a relatively unprotected operating system mode.

2. Present State of the Art

When multiple components process a stream or amount of data, they will typically place a quantity of data, such as a frame, into a buffer, process the data, and copy the manipulated data into another buffer corresponding to another processing component. If there are multiple independent processing components, the sheer volume of data transfers between buffers can impact processor performance to the degree that it may inhibit the actual processing of the data itself in a timely fashion.

While this problem may occur with any type of data processing between different components, it is particularly acute with the media data found in multimedia applications. This is due, in part, to the large quantities information generated that is in many instances tied to a time frame to effectively produce a veritable "stream" of continuous data for processing. Such media information may come from a live feed over a network, phone line, digitizing hardware, etc. or some other source such as a file and usually must be processed in "real time" so as to be coherent to a viewer or listener.

In a multimedia environment, when processing a stream of media data, the processor performance impact due to data transfers between different buffers creates a latency problem that reduces overall media processing and rendering performance of a hardware/software system. A latency problem may be so bad as to limit what a particular system may handle in terms of multimedia capabilities. The situation becomes exacerbated on general purpose computer systems such as a processor running Windows NT™ by Microsoft® because of the already existing demands on the processor. Reducing latency problems opens many opportunities to provide low-cost multimedia applications that would otherwise be unavailable. If latency is sufficiently reduced by increased system processing efficiency and other means, a general purpose computer system will be able to run multimedia applications that were previously not possible.

Another problem associated with multiple buffers corresponding to multiple processing components is the amount of system resources that may be used and therefore unavailable to other applications. In other words, if each processing component has its own buffer taken from system resources such as system memory, system resources become more scarce thereby causing inefficiencies that may result in degraded system performance.

Shared memory between processes and components attempts to address the resource allocation problem and allow shared buffers. A shared memory facility normally occurs at an operating system "user mode" that has significant safety overhead to assure only authorized applications used designated address spaces in system memory and where user written applications are run. The safety mechanisms are for assuring that one application or process will not impact another application.

In a multimedia environment, it is advantageous to interconnect software drivers to that processing may occur in software drivers that run in a operating system mode with a much higher run priority and little security protection to allow access to actual hardware that the drivers, in many instances, directly manipulate. Many applications are benefited by running in this looser and more performance-oriented mode, generally referred throughout, in Windows NT terminology, as "kernel mode." Other robust operating systems will have a functionally equivalent mode.

One prime example of a program currently incapable of easily using kernel mode drivers, used throughout this application, comprises graph building functionality that allows a user to select and connect together different processing blocks, called filters, to successively manipulate a stream of multimedia data. The data typically is a series of samples representing sound or video and the processing blocks may include decompression processing for compressed data, special effects processing, CODEC functionality, rendering the data into analog signals, etc.

Such filters typically are located in user mode so that the graph builder portion of the program may interconnect and control their operation and be responsive to user input and rearrangement of processing blocks. Because of the consistent stream nature of multimedia data and the generation of large quantities of data, performance is a critical issue. In a general purpose operating system, system performance caused by repeatedly passing/switching back and forth between user mode and kernel mode can be so degraded as to prohibit certain multimedia applications as mentioned previously.

Furthermore, the processing blocks will many times have hardware associated therewith requiring multiple transitions between user mode and kernel mode components. Such transitions comprise another form of overhead that takes away from the overall multimedia processing system performance. When making transitions between user mode kernel mode, there may also be overhead associated with copying the data between different buffers that would be unnecessary if the processing remained in kernel mode.

What is needed is a mechanism for creating a shared buffer and communicating its existence between independent software drivers so that data may be processed in the same buffer by two or more components in an interconnected software driver environment. It would be advantageous for such a mechanism to also communicate buffer requirements of a software driver to allow a third party agent such as a graph builder dynamically interconnect different software drivers to accomplish a certain media stream processing sequence.

SUMMARY AND OBJECTS OF THE INVENTION

It is an object of the present invention to separate the buffers holding data for processing from a series of distinct processing components so that each processing component can sequentially process the data without necessarily transferring the data to a buffer associated with the processing component.

It is an object of the present invention to reduce the number of inter buffer data transfers associated with the processing of data by a plurality of separate and distinct processing components.

It is another object of the present invention to reduce latency effects in multimedia system.

It is a further object of the present invention to allow general purpose computing systems with the ability to handle data intensive multimedia applications with greater effectiveness than heretofore possible.

It is yet another object of the present invention reduce the need for system resources in processing applications having multiple processing components by providing a standardized way to communicate buffering needs and buffer allocation abilities of a particular component.

It is an object of the present invention to allow a third party component to create available buffer allocation mechanisms as part of interconnecting separate components as determined by first querying and receiving the requirements of all components prior to making the interconnections.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method and computer program product for reducing inter-buffer data transfers between separate processing components is provided. A processing component, such as a kernel mode driver, will have certain buffering requirements such as byte alignment or frame processing sizes that it can support as well as buffer creation and management capabilities in order to provide buffers according to the requirements. A buffer may then be created with some reference (e.g., reference to the buffer allocator or the buffer itself) being given to another processing component earlier in the processing chain. If no new buffer is required, a processing component will simply process the data in the existing buffer (e.g., in place or in situ processing) regardless of location or by what entity created.

A processing component will, therefore, only transfer data to a new buffer when one is necessary for the next processing component in the chain. Since different combinations of chains are possible with interconnected processing components, some occasions will require a buffer allocator and others will not depending on the particular processing component arrangement. Processing components should therefor support the ability to communicate buffer requirements and capabilities to a third party component that will be responsible for making the interconnections between processing components and assuring that buffering is done properly between processing components.

One embodiment of the present invention occurs as part of connecting kernel mode drivers in a standardized fashion. A given driver or filter will support and define pin factories that are used to instantiate connection pin instances that may be interconnected to connection pin instances on other drivers to allow processing messages to be consecutively processed in kernel mode by the drivers without necessary resort to a user mode agent.

A third party agent desiring to connect compliant drivers will query the drivers of their capabilities through reference to connection pin factories. Such capabilities include what kinds of connection pin instances may be instantiated, including their relevant characteristics, such as type of data handled, data formats, transfer rates, medium or mode of transfer, input or output nature of a connection pin instance, etc. Also queried will be the data buffering requirements and capabilities for allocating buffers available at each connection pin factory.

Once a third party agent, typically running in user mode, has queried the capabilities of one or more compliant drivers, the agent will determine the best connection characteristics for "chaining" multiple drivers together so that data may be optimally processed between them. This determination step occurs after all driver capabilities have been queried so that the optimal connection criteria may be selected.

For each connection pin instance, the third party agent will also determine whether a buffer allocator need be created on a particular pin instance. Again, this is done after having queried all the different filters and pin factories prior to making any interconnections.

The third party agent then interconnects the drivers by creating the necessary connection pin instances utilizing the pin factories found on the filters. The agent will specify a data format and a connection format as part of the connection pin instance creation. Furthermore, if a buffer allocator is needed for a particular pin instance, the third party agent will create the allocator using the the handle of the connection pin instance as a parent. In an exemplary embodiment implemented under the NT operating system, an actual connection pin instance is created by a create I/O operation that returns a handle to a "file." The create I/O request will contain the driver instance handle and reference to a data structure indicating data format and connection format for the connection pin instance.

Furthermore, reference to previously created connection pin instances (e.g., input pin instances or IRP "sink" pins) will be specified in requests for creating other connection pins (e.g., output pin instances or IRP "source" pins) in order to effectuate a connection between connection pin instances. After a source pin instance is created using a reference to an input pin instance having a buffer allocator, indication is made with the source pin instance of the buffer allocator so that data may be transmitted into the new buffer from the existing buffer. If no reference is indicated, the source pin will leave the data in the existing data after processing.

In order to create a compliant driver, a driver developer will support certain standard facilities to allow a user mode agent to query capabilities and make interconnections between drivers. In one embodiment built on the Windows NT operating system, this is achieved by use of "sets" (i.e., property, method, and event sets) that implement the desired functionality.

A set is logically defined as having a GUID (globally unique identifier) to identify the set as a whole and a RUID (relatively unique identifier, e.g., relative within the set itself) for each element of functionality within the set. Each set is associated with only one or two IOCTLs (IO Controls), and an IOCTL combined with a set specification controls all interaction with the driver.

As currently embodied, three types of sets are utilized, namely, property sets, method sets, and event sets. Property sets are used for managing values or settings within the driver, such as sound volume, transfer rate, etc., and use a single IOCTL with a flag indicating whether the call is getting a property value and or setting a property value. Method sets are used for managing the operations that a driver may perform, such as allocating memory, flushing buffers, etc., and uses a single IOCTL to call the specified method. Event sets are used for managing events associated with driver processing, such as device change notification, data starvation notification, etc., and uses two IOCTLs, one for enabling a specified event and one for disabling a specified event.

To use a set, an I/O control operation is initiated using the specified IOCTL and reference to a data structure having the set GUID, RUID, and other necessary data. For example, setting a volume property on a sound card driver would entail an I/O control operation using a set property IOCTL, specifying the appropriate GUID for the property set having the volume setting, indicating the specific RUID within that set indicates the volume property, and containing the new volume setting value.

To query the sets supported, a null GUID is used along with a query flag on a specified IOCTL for a particular set type (e.g., property set IOCTL, method IOCTL, or event enable IOCTL) and a list of set GUIDs supported will be returned. To query supported properties, methods, or events within a given set, the set GUID, set type IOCTL, and a query flag are used with the operation returning a list of supported RUIDs.

By using the generic set mechanism, a minimum of functionality may be implemented to support a compliant driver but still allow unlimited extensibility. A set may be defined in a written specification that can be independently coded by a multitude of different driver developers to create a system of interoperable and interconnectable drivers as long as particular sets are implemented. Furthermore, the specification can define mandatory properties, methods, and events that must be supported as well as optional properties, methods, and events that can be implemented depending on the driver functions and advanced capabilities. In addition to the basic minimum commonality required, driver developers may incorporate additional functionality by defining their own sets and assigning them a GUID. By being able to enumerate supported functionality (i.e., make queries for supported GUIDs and RUIDs ), a caller, such as a third party controlling agent, can adjust expectations or make appropriate compensation depending on the capabilities of the underlying filters.

In order to create a buffer allocator instance, a create I/O operation is again used specifying the particular connection pin instance by its handle as parent will return another handle representing the buffer allocator. This buffer allocator handle is then placed in a property found on a source connection pin instance so that the filter knows to transfer data to the new buffer managed by the indicated buffer allocator utilizing appropriate stream I/O operations.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 11A shows a logical arrangement and processing of the allocated buffer frames as they are passed from one processing component to another. FIG. 11B illustrates a buffer allocator being represented as a file object that is a "child" of a file object representing an input pin instance in a system of interconnected kernel mode filters. Both FIGS. 11A and 11B illustrate the same filter graph topology.

DETAILED DESCRIPTION OF THE PREFERRED EMBODIMENTS

Figure 1:
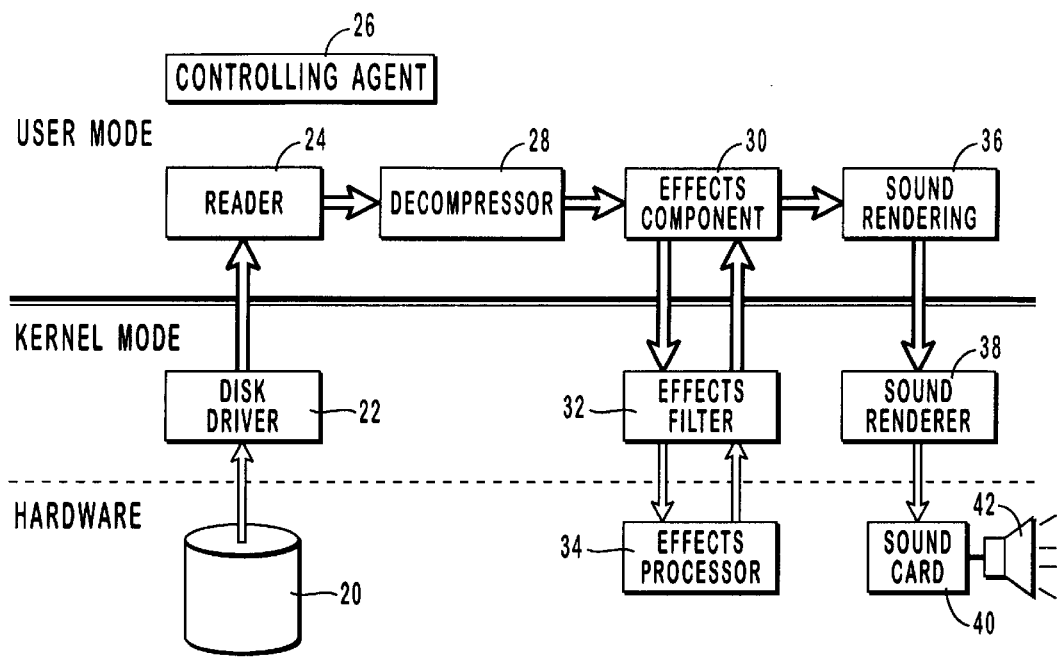
FIG. 1 is a prior art data flow diagram showing a system of interconnected filters and drivers under the direction of a controlling agent for bringing sound data from a disk file, processing the sound data in some form, and rendering the sound data to be played through a speaker.

As used herein, the term "user mode" refers to a level of operation in an operating system where most user written programs run. The user mode level of operation is typically the most secure level and has a significant amount of overhead to prevent one application program or process from interfering with another application program or process. Furthermore, access to system resources is highly controlled through specific interfaces and run priority is generally one of the lowest, if not the lowest.

As used herein, the term "kernel mode" refers to a level of operation in an operating system having significantly less restrictions than the user mode level of operation. Examples of kernel mode programs or processes would include software drivers for controlling hardware components. Typically, kernel mode programs are performance sensitive, and therefore, have less operational overhead than user mode programs. Furthermore, access to hardware and many system resources is unrestricted or much less restricted than for user mode programs. In many instances, program code running in kernel mode relies on programmer discipline and conformity to convention in order to establish good system behavior (e.g., not disrupting another program's address space, etc.). Another term used for kernel mode is "trusted" code.

As used herein the term "driver" refers to software driver programs typically running in kernel mode. The term driver may also refer to the actual executable program that is loaded onto the operating system or a portion thereof that imparts certain functionality. Drivers are in many instances, though not necessarily, associated with some form of hardware.

As used herein, the term "filter" refers to a portion of the functionality found within a software driver, including the entire driver itself, where connection points may be exposed for sending data through the filter. For example, a software driver may support a number of different filters or may have one single function. Furthermore, a number of filters from different drivers that are internally connected together and externally exposing connection points for input and output may collectively be referred to as a single filter. Also, in a more generic sense, the term filter may refer to the operation performed, such as decompression, etc., regardless of whether that occurs in a software driver filter running in kernel mode or another piece of program code running in user mode.

As used herein, the term "driver object" refers to an operating system entity, defined by the operating system, for managing and making known a software driver as a system resource.

As used herein, the term "device object" refers to a system level entity defined by the system, for making known a portion of a drivers functionality available for use as a system resource and defines the driver functionality and availability to other system components. Both the driver objects and device objects are typically created upon loading and initialization of the driver software.

As used herein, the term "file object" refers to an operating system entity, defined by the system, for managing an invocation of a resource specified by a device object. A file object provides a context for usage of a driver object. Furthermore, a file object may be hierarchically related to another file object if the previous file object is designated as a "parent" during the creation of the new file object. File objects are typically used in managing all I/O operations that operate on a stream of data.

As used herein, the term "data" refers to any information that is processed through the interconnected kernel mode filters. Such data includes media data representing video, audio, text, MIDI, etc. but may also include control information or parameters for other applications. For example, a kernel mode filter graph may be used in process control operations where the control information passed between the different filters is used to develop control signals for actuating machinery. While examples are given of media processing systems, other applications could in like manner benefit from the system of interconnected kernel mode filters explained herein.

Throughout this application, the description of the present invention is described within the context of the Windows NT™ operating system available from Microsoft®. Furthermore, familiarity with the Windows NT I/O architecture is presumed in order to understand the preferred embodiment explained herein. A good tutorial of the I/O system as well as the NT operating system in general can be found in the book "Inside Windows NT" written by Helen Custer and published by Microsoft Press and is further incorporated herein by reference.

While the discussion of the drivers and system entities such as file objects, device objects and driver objects are explained herein within the context of how they operate in the Windows NT operating system, those skilled in the art will appreciate that the present invention may be implemented on other operating systems having analogous components, whether or not they use the same terminology. For example, should another operating system have an entity that operates as a file object, it could be interpreted as a file object regardless of its actual title.

Referring now to FIG. 1, an example system is presented for reading a stream of sound data from a disk drive and rendering that sound data so that it may be heard through a speaker according to the prior art model. An amount of data is stored on hard drive 20 representing sound in the form of digitized sound samples. Alternatively, the source of the sound data stream may be digitized information coming over a phone line, digitized information from network or other communication packets, or other sources known in the art. The data stream is composed of digitized samples having time interval information associated therewith either by data format and convention or by explicit timestamp information attached to each sample. A kernel mode disk driver 22 interacts with the disk drive hardware 20 and is under control of a user mode reader program component 24. A controlling agent 26 manages the different components in order to effectuate the rendering of the sound data and may include dynamic graph building capabilities so that the different software components may be dynamically allocated in order to provide custom filtering or other processing paths as designated by an end user.

The reader component 24 will interact with disk driver 22 using a standard I/O control interface of the operating system and will cause the compressed sound data to be read from the disk drive 20 into buffers allocated in user mode as part of the user mode process address space. Next, a decompressor component 28 will decompress the compressed data into its decompressed format for processing. As shown, this step is done entirely in user mode with the attendant lower priority and process behavior safety mechanisms.

The effects filter 30 will operate on the data to provide some special effect and will have an accompanying effects filter 32 operating in kernel mode. Furthermore, an effects processor 34 may be present or the effects filter may operate entirely in software emulating the actual hardware processor. In order to access the effects filter 32 the effects component 30 will use the system I/O control mechanism to transfer the data and control to the effects filter. Again, the kernel mode/user mode boundary is crossed in order to make this transition.

The effects filter 32 will control the effects processor 34 and cause whatever special effect is necessary or desired to be made on the data. This may entail copying all the data from the effects component 30 down to the effects filter 32 and again to the effects processor 34 depending on actual system configuration. While many software effects components have a hardware processor associated therewith, others function entirely within system software running on the host processor.

After control and the data is transferred back into user mode at the completion of the processing of the effects component 30, it is then transferred to sound rendering component 36. The sound rendering component 36 will transfer the control and data to the sound rendering driver 38 which in turn controls the sound card 40 in order to render the data, as processed and filtered, as sound through speaker 42. As can be readily seen, there exists a variety of transfers between user mode and kernel mode that add inefficiencies to the rendering of the sound data. Because of the timing sensitive nature of multimedia data, such as a continuous stream of sound or video, it is advantageous to reduce these inefficiencies and transitions of control as well as the multiple copying of data between different buffers.

One embodiment of the present invention and used throughout will consist of a service provided on the Windows NT operating system architecture. This service is broken into different software components that a user of the system will access. First, a user mode API is available that will include a routine for creating connection pin instances and other file objects representing particular functionality, such as a clock mechanism or a buffer allocation mechanism. Additionally, and more importantly, there will be a complete set of routines and data structures to assist the driver developer in making drivers that are compliant with the standardized architecture. By utilizing such facilities from the system, different driver developers may create compliant drivers that will interact with one another according to the specified architecture. User mode agents communicate with compliant drivers through an environment subsystem running in user mode that will communicate with the system services of the NT executive and the I/O manager. This is the same standard I/O mechanism for all other I/O and the present implementation of the preferred embodiment will utilize existing system services as much as possible.

Figure 2:
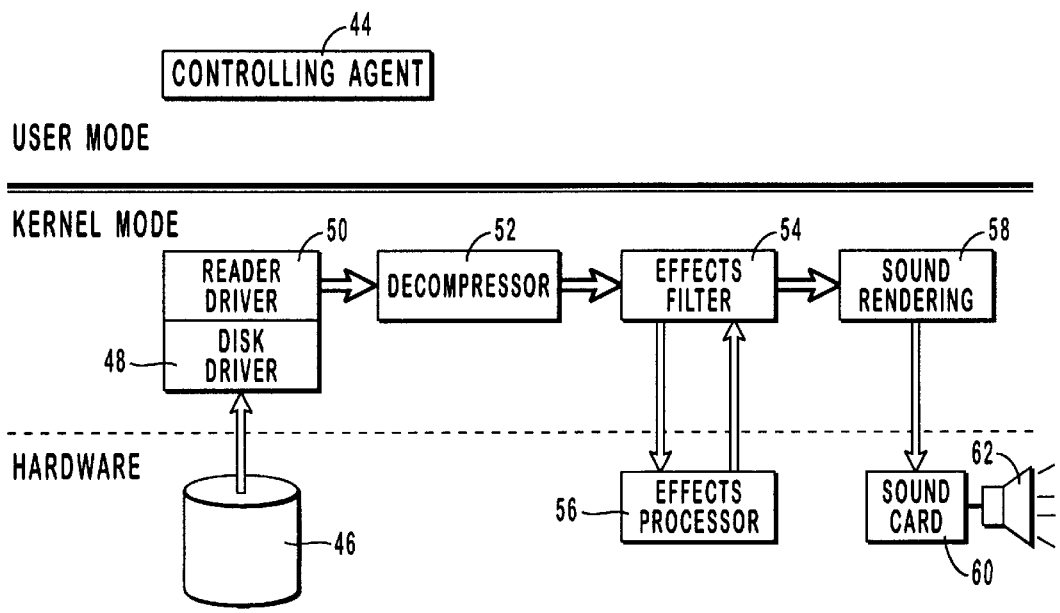
FIG. 2 shows a system according to the present invention having the same purpose as that shown in FIG. 1 to read sound data from a disk drive, process that data, and render that data to be heard on a speaker, wherein the processing filters and rendering are handled by interconnected kernel mode drivers, again under the direction of a controlling agent.

The architecture of the system of FIG. 1 utilizing the present invention will appear as shown in FIG. 2. A controlling agent 44 will query the drivers known in order to then make interconnections according to data format and connection format to effectuate the rendering entirely in kernel mode. Furthermore, the controlling agent will receive notifications of important events so that it may exercise control as necessary. Examples of such events would include end of processing, a data starvation situation, etc.

In this configuration, the sound data is read from disk drive 46 by the disk driver 48, as before. A reader driver 50 controls disk driver 48 and is "vertically" associated with disk driver 48 according to the NT layered I/O architecture as used in conventional fashion. The terms vertically and horizontally are used to distinguish driver connections that currently occur as part of the NT layered I/O architecture (vertical) and connections according to the interconnected kernel mode drivers made dynamically by a third party controlling agent (horizontal).

Reader driver 50 is also interconnected "horizontally" to a decompressor driver 52 according to the connection methods explained hereafter and is managed by the controlling agent 44. Decompressor 52 will perform the decompression in kernel mode before passing the data and control to the effects filter 54. The effects filter will apply the special effects utilizing an effects processor 56 as necessary before passing the data and control to the sound rendering driver 58 that controls the sound card and causes the data to be rendered as sound on speaker 62. As can be noted by reference to FIG. 2, keeping processing in kernel mode represents an efficiency advantage by eliminating multiple transitions between user mode and kernel mode and by reducing the amount of overhead normally associated with processing in user mode.

Figure 3:
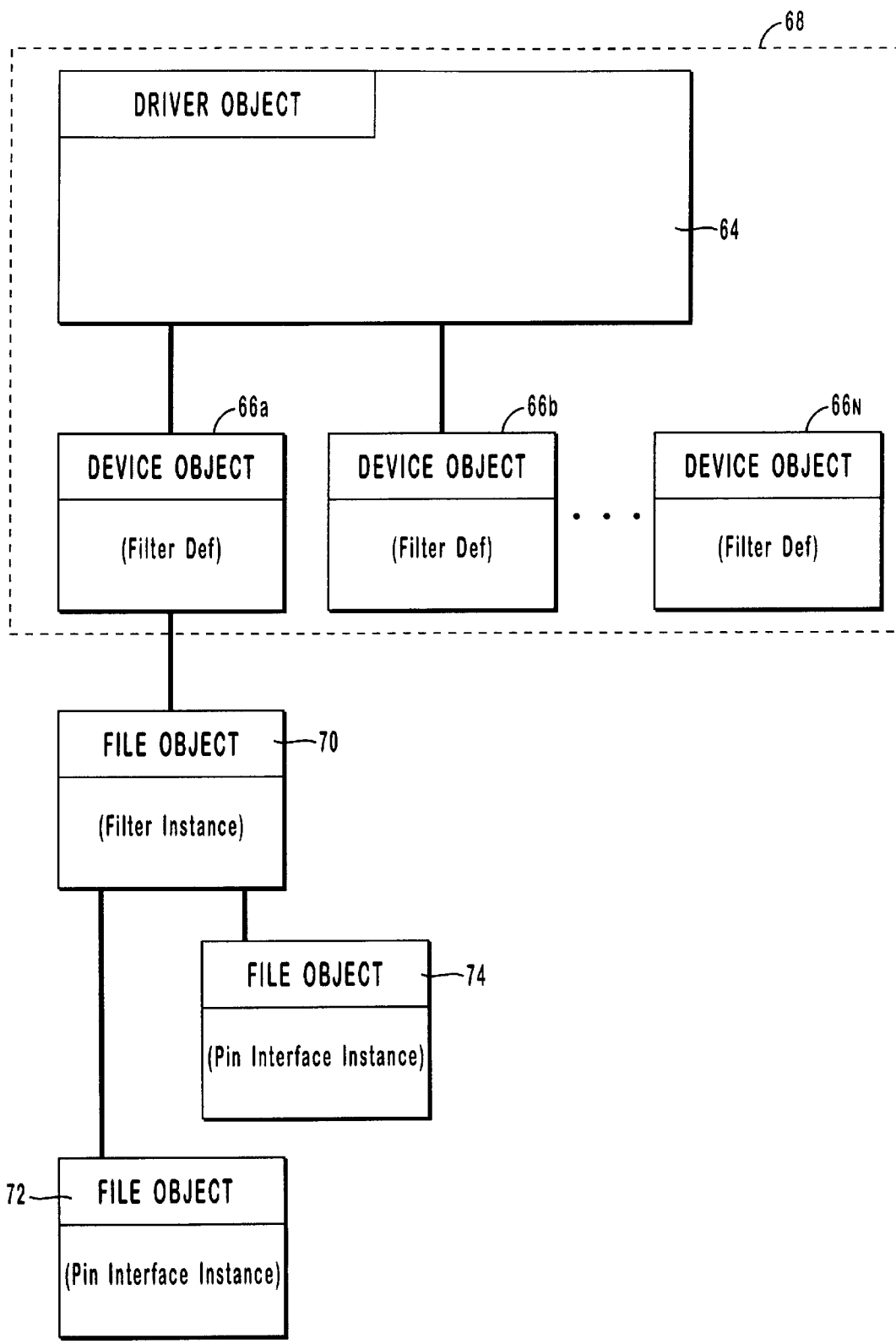
FIG. 3 is a vertical relationship model showing the relationships between driver objects, device objects and file objects as created and used in an operating system.

Referring now to FIG. 3, a logical diagram showing the hierarchal nature of system objects related to interconnected software drivers compliant with one embodiment of the present invention is shown. A driver object 64 is created to represent the executable software code image as loaded in memory. The driver code image contains the entirety of the driver's functionality, and the driver object 64 includes information regarding the image, such as its location on the system, the kinds of devices supported, etc.

For each type of independently accessible functionality by a controlling agent, device objects 66a–66N are created in the I/O directory structure representing the different functions that are available that will be accessed by user mode clients. These typically represent filters or other portions of functionality independently available. The driver object 64 and the device objects 66a–66N are created upon installation of the driver code as represented by the enclosing box 68.

Historically, a device object exists for each element of physical hardware. The flexibility in modem I/O systems, however, allows a device object to represent a filter implemented entirely in software. As such, device objects may be readily created for each instance of a filter implemented solely in software. A software filter may therefore be implemented so that each instance as represented by a device object has a one-to-one correspondence with a device object or a single device object may follow the more traditional approach and manage multiple file objects, with each file object representing a client instance of the filter.

Upon a device object, as shown for device object 66a, file objects are created representing independent instances of the functionality represented by device object. While a device object represents a filter and may manage multiple instances of that filter, a file object represents the actual instance of that filter used by a particular entity. Therefore, file object 70 is an instance of the filter defined by device object 66a.

To use a filter, the controlling agent or other user mode client opens a file on a device available in the I/O directory structure. A file object with appropriate context information will be created and a handle to that file object returned to the user mode client. While file objects may be hierarchally related by specifying a "parent" file object during creation, file objects will also have a sibling relationship in that they are all children of the same device object.

Context information within a file object consists of information to manage the I/O interface with user mode clients, the "state" of the entity that the file object represents, etc. The context information has system required information and further includes user definable areas that can be given special meaning. An example of how the user definable area can be used will be shown hereafter discussing the implementation of a validation and IRP routing method.

In order to provide connection pin instances, the file object 70 representing a filter instance will be used as a parent in creating children file objects representing the connection pin instances for a particular filter. While file object 70 will be queried for the connection pin factory definitions and availability, actual file objects will be created for each instance of such a pin factory, using the particular file object as the appropriate informational context in order to validly and correctly create the connection pin instance. For example, file objects 72 and 74 represent connection pin instances for the filter represented by file object 70 and are hierarchally related to file object 70. The connection pin instances, as represented by file object 72 and 74, respectively, may be a data path into and then out of the filter instance (represented by file object 70) which can be used for connecting to other connection pin instances in forming a series of chained filters or other driver functionality.

Just as a pin instance is represented by a file object having a hierarchial relationship to another file object representing the filter instance in order to provide context information for the pin instance, other file objects may be hierarchically related to a pin instance in order to represent other functionality so that proper context information is available. Context information is necessary to distinguish one pin instance from another according to the individual parameters used in creation, such as pin data format, communication type, etc.

Other operational entities, such as a buffer allocation mechanism, a timing mechanism, etc., requiring either an individual context or user mode control through a handle may also be represented by file objects. Furthermore, hierarchical relationships between the file objects (e.g., a buffer allocation mechanism associated with a particular connection pin instance) may be established if necessary by specifying a parent file object during creation of the child file object. These parent/child relationships exist to determine relationship and structure between the file objects representing the operational entities. Additionally, a particular type of "parent" file object will only be able to produce certain types of "children" file objects, thus requiring the creation validation mechanisms as explained hereafter. Again, such file objects have corresponding handles available in user mode that are returned to a client through a system API call such as NtCreateFile.

The handles to file objects are used by user mode clients, such as a controlling agent, to communicate with the kernel mode drivers. The hierarchical chain of file objects, device objects, and driver objects allows the I/O subsystem to traverse back to the driver object through the hierarchically related file objects and device objects to arrive at the entry points into the actual driver code. Such entry points are references (e.g., pointers) to functions in the software driver code. Furthermore, each of the objects in the object pathway between a particular file object and the driver object having the entry points to the software driver code provides important context information for the I/O subsystem in creating IRPs as well references into data structures used for properly routing IRPs according to the routing and validation mechanism explained hereafter.

Handles for file objects and other system objects are process-specific and are the means by which a user mode process will communicate with an underlying object. It is interesting to note that multiple handles may be created to reference a single underlying system object, such as a file object. This means that multiple applications may be feeding information to a pin instance as represented by a file object.

One element of information that is important for interconnecting different drivers is the device object stack depth parameter. This will indicate the IRP stack location of a particular driver object. In this manner, a single IRP may be used and passed between interconnected drivers using the I/O manager, thereby providing a performance enhancement over separately creating and sending IRPs between the various interconnected drivers. Alternatively, each driver could create through appropriate I/O manager calls new IRPs for each successive communication and cause each new IRP to be sent to the next driver in the chain of interconnected drivers.

Figure 4A:
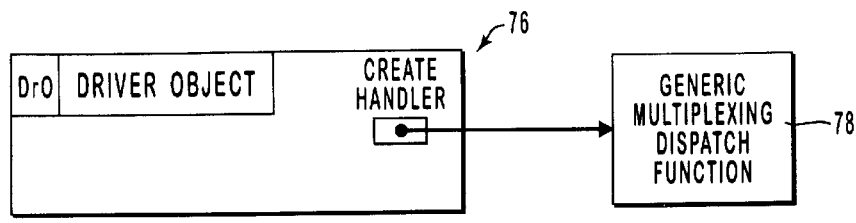
FIGS. 4A, 4B and 4C are logical block diagrams of a driver object, device object, and file object, respectively, showing their logical relationship with the data structures and program code to route messages to appropriate process handling code and to validate the creation of new file objects according to the system of the present invention.
Figure 4B:
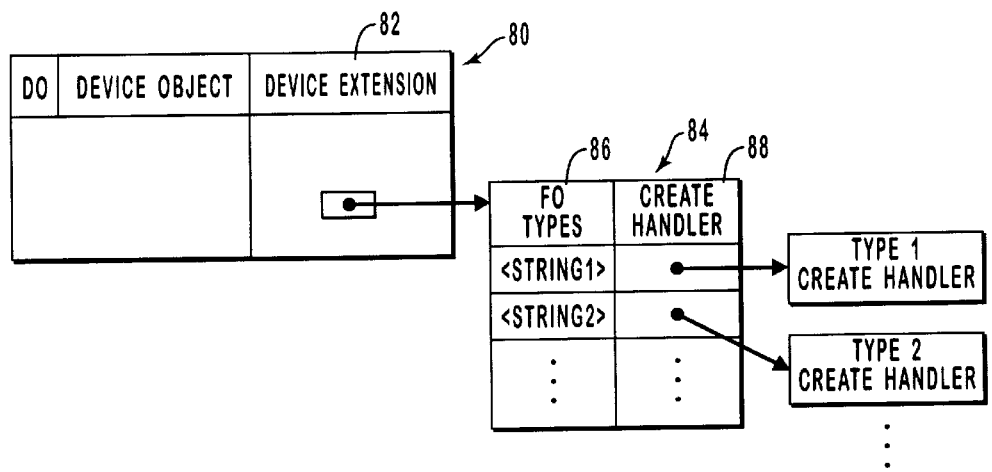
Figure 4C:
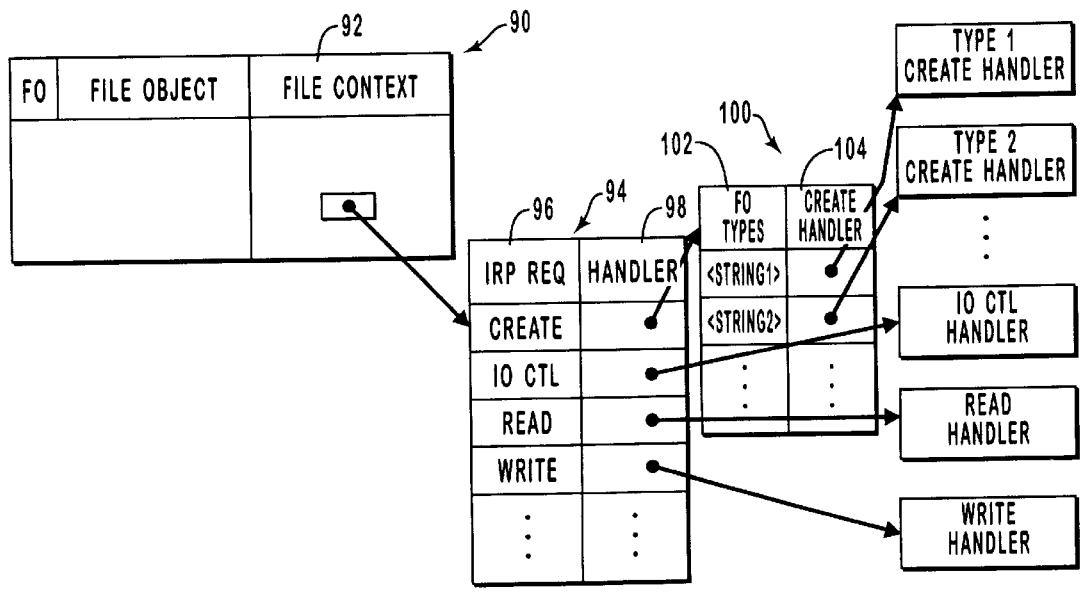

Referring now to FIGS. 4A–4C, extensions to the system driver objects, device objects, and file objects are shown that allow validation of file object creation of differing types as well as I/O Request Packet (IRP) routing to appropriate handlers. FIG. 4A shows a driver object 76 representing the executable code implementing one or more filters or other driver functionality. Within the driver object, the Windows NT architecture requires a reference to a create handler provided by the software driver developer. According to this embodiment, a multiplexing dispatch function 78 is referenced from the driver object 76 as the create handler and will be used to route messages to particular create handlers depending on the file object type to be created. Operation of the multiplexing dispatch function 78 will be explained in connection with the flow chart shown in FIG. 6 hereinafter.

In like manner, other handlers from the driver object will indicate a multiplexing dispatch function and, depending on implementation, they may be the same function. In other words, as explained in more detail below, each type of I/O handler reference (e.g., read, write, device control, etc.) will point to a multiplexing dispatch function that uses the extension data in a device object and the context information in a file object in order to route the message to the appropriate handler. The extension data in the device object that references a validation table will be used when no parent file object is specified on a create operation. Otherwise, the parent file object context information will indicate the correct validation table.

FIG. 4B shows a driver object 80 which has a particular device extension area 82 that can be utilized as desired by the driver developer and includes driver specific information. At a defined location within the device extension area 82 of the driver object 80 is a reference to a data structure, known as a file type validation table 84, containing sting representations of file object types 86 and references to the associated create handlers 88 for each file type represented. The create multiplexing dispatch function will the utilize file type validation table 84 to validate the file object type to be created and then turn control over to the appropriate create handler as will be explained in detail hereafter in connection with the discussion of FIG. 6. The string to be validated is found in the IRP create request and originates from the file name string used with the NtCreateFile function call in user mode. The NtCreateFile call is made within the user mode function cell to create a pin instance or other mechanism.

FIG. 4C shows a file object 90 having a file context area 92 that is free to be used by the software driver developer. Reference is made from the file context area 92 to an IRP request handler table 94. The different types of IRP request 96 are associated with references to particular handlers 98, and the appropriate multiplexing dispatch function will use this information to access the correct handler. In the case of determining the correct create handler, a data structure known as a file type validation table 100 is referenced having string representations of file object types 102 and references 104 to the associated create handlers for each file type represented. For children file objects (i.e., file objects that have another file object rather than a device object as parent), the type is represented by a string that is compared to the strings in the file object types 102. When a match is found, the associated create handler is accessed using a reference from the references 104 that is associated with the matched file object type string. If no match is found, then the request is invalid and an error indication made.

Figure 5:
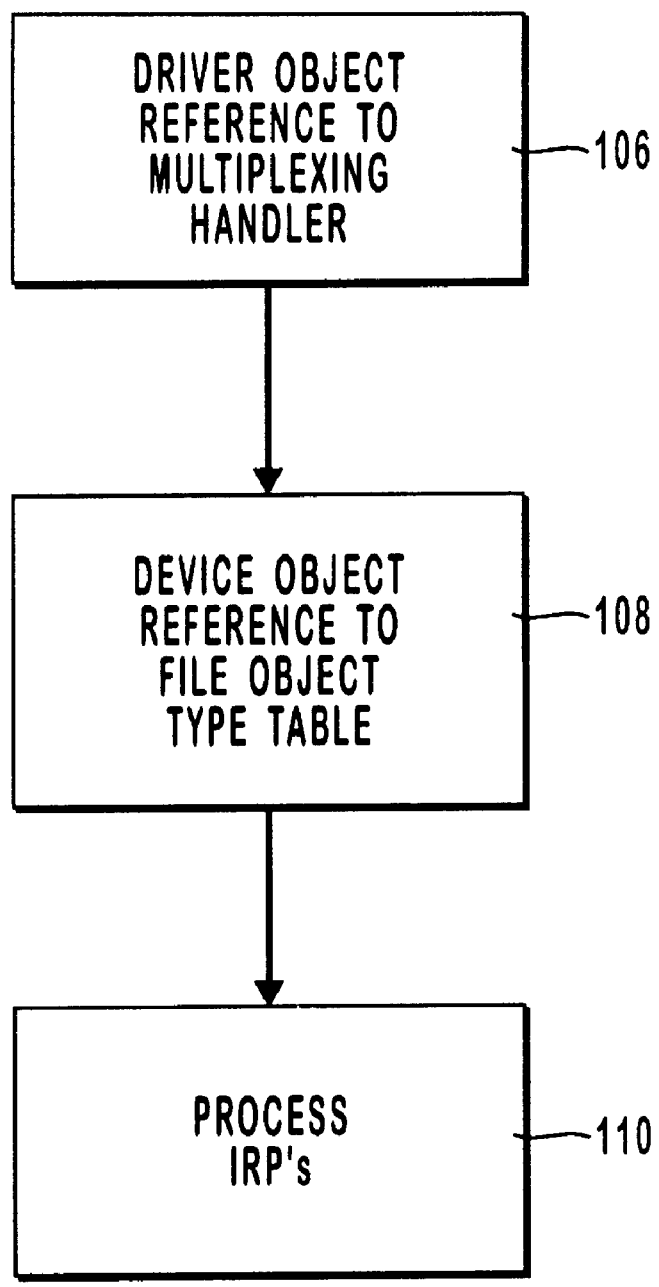
FIG. 5 is a flowchart showing the initial set up of the routing and validation componentry and the processing of I/O messages by the kernel mode drivers.

Referring now to FIG. 5, the installation procedure for setting up the creation validation and mechanism is shown. At step 106, the installing program will make reference in the driver object to the appropriate multiplexing dispatch functions. As shown in FIG. 4A, the create handler points to a generic mulitplexing dispatch function. In like manner, all other handler references in the driver object 76 would point to other generic multiplexing dispatch functions germane to the particular handler as necessary. Alternatively, each handler reference could point to the same multiplexing dispatch function that could in turn process the IRP request and route it to the appropriate handler. Such an alternative multiplexing function will necessarily be more complex in order to accommodate different kinds of request (e.g., create, write, etc.).

Next, at step 108, each device object created as part of the software driver executable code installation will be adjusted to reference the file type validation table 84 as shown in FIG. 4B. Finally, at step 110, the processing of IRP requests will begin with the multiplexing dispatch function using the file type validation table 84 as referenced from the appropriate device object 80.

When a file object is created, the appropriate IRP dispatch table 94 will be created and referenced along with the indexed file object type validation table 100 as necessary. The creation of the file object type validation tables occurs within the provided create handlers according to file object type. The data structures are created representing the IRP dispatch table 94 and the file object type validation table 100 and a reference thereto stored at a specific location with the file context information 92 of the particular file object 90 being created.

Figure 6:
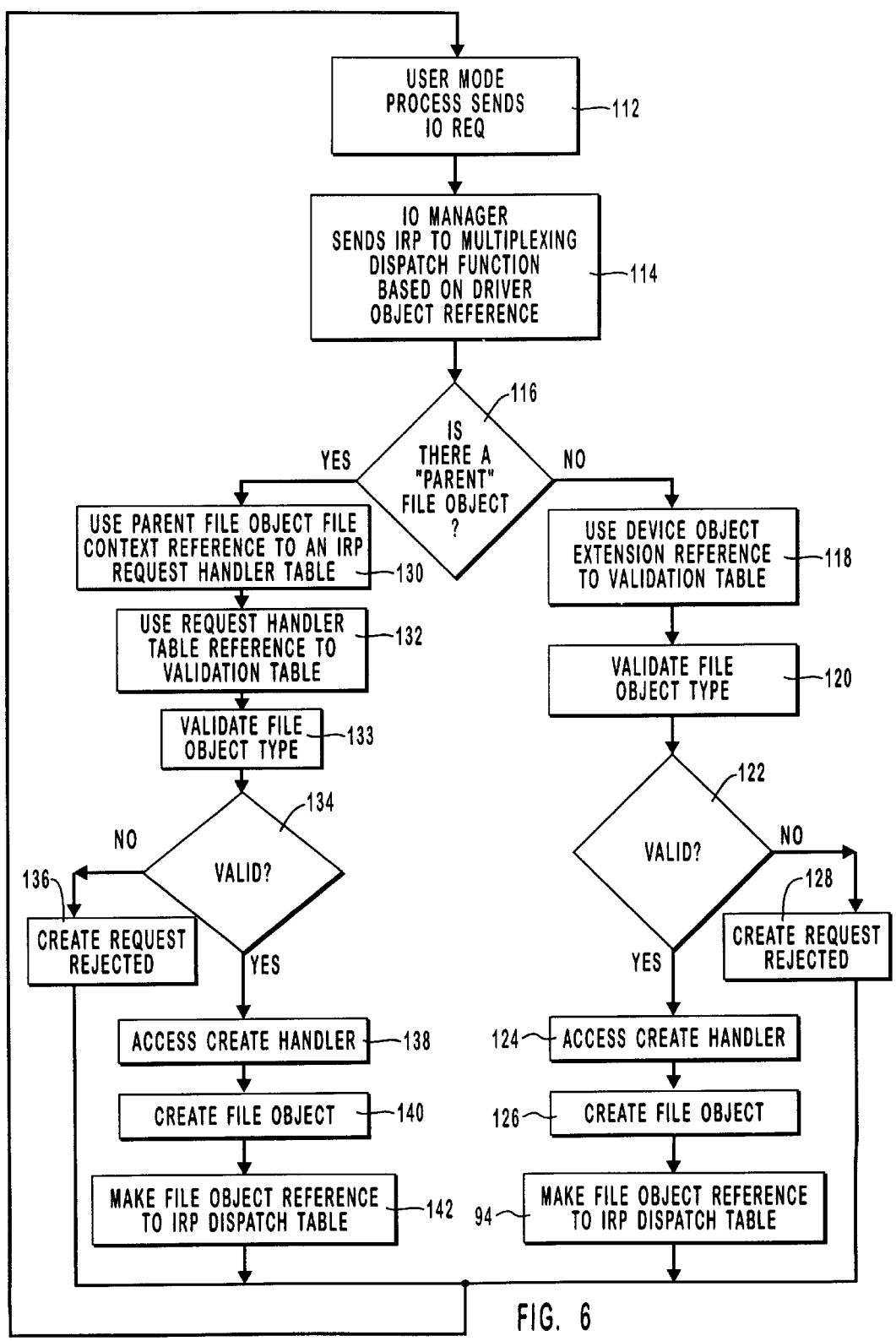
FIG. 6 is a flowchart showing in more detail the processing of a controlling agent, the routing and validation mechanisms, and specific create handler routines for creating a new file object.

Referring now to FIG. 6, a flow chart is presented showing the operation of the create multiplexing dispatch function and its validation mechanism including its interaction with the data structures referenced from the system driver objects, device objects, and file objects. At step 112, a user mode process sends an I/O request for creating a file object. This I/O create request is made using an invocation to the system API for NtCreateFile. At step 114, the I/O manager sends the IRP to the multiplexing dispatch function 78 based on the reference in the driver object 76 (see FIG. 4A).

Once the multiplexing dispatch function 78 has the IRP for the create request, a test is made at step 116 to determine if there is a parent file object. The information necessary to make this determination will be found within the IRP itself and originally be supplied by the user mode process. The user mode process will supply a handle referencing the "parent" file object as part of the create request and the NT system will create the IRP having the correct reference to the "parent" file object.

If there is no parent file object, the right branch is taken, and the multiplexing dispatch function 78 uses the device extension 82 from the appropriate device object 80 to reference a file type validation table 84 (see FIG. 4B) at step 118. Using the validation table 84, the multiplexing dispatch function 78 will validate the file object type at step 120 by comparing the string in the request with the file object types 86 strings.

If there is a matching string as determined at step 122, the appropriate create handler is accessed at step 124. Otherwise the create request is rejected at step 126. The create handler as accessed at step 124 will create, or cause to be created, the file object at step 126. With the created file object, the appropriate create handle will make the file object reference in the file context 92 to an IRP dispatch table 94 that it has previously created.

Again at step 116, it may be determined that there is a parent file object present. If a parent file object is present, as determined at step 116 as found in the IRP associated with the create request, the multiplexing dispatch function 78 uses the file context 92 from the parent file object 90 to reference an IRP dispatch table 94 (see FIG. 4C) at step 130. For a create request, the multiplexing dispatch function 78 will access a file type validation table 100, at step 132. Using the file type validation table 100, the multiplexing dispatch function 78 will validate the file object type at step 133 by comparing the string in the request with the file object types 102 strings, as was done above.

If there is a matching string as determined at step 134, the appropriate create handler is accessed at step 138. Otherwise the create request is rejected at step 136. With the appropriate create handler, the file object is created at 140, and the create handler will make a new IRP dispatch table 94 for the newly created file object and will make reference in the newly created file object 90 file context area 92 to the newly created IRP dispatch table 94 at step 142. Note that the same file object structure as shown in FIG. 4C is used to explain interaction with both the parent file object and the validly created child file object. While the same structure exists in both cases (once the new file object is created), they will be used differently and contain different information.

Whenever a connection pin instance is created, a connection pin ID is passed that identifies the pin factory in the filter that "supports" the creation of the pin instance. Those skilled in the art will note that the connection pin ID may also be validated as a string in a validation table in much the same manner as the file object is validated and that other implementation variations exist.

In order to make connections between different drivers, a common mechanism must be present to assure that a given driver supports such interconnections. This common mechanism must allow discovery of filter capabilities including connection pin factory capabilities. Furthermore, such a mechanism should also be extensible to provide additional flexibility to driver developers.

One mechanism chosen in the present embodiment for defining compliant drivers and allowing discovery of capabilities are identified "sets" of related items. This is a convenient mechanism to be used with existing I/O communication mechanisms. A set is logically defined as having a GUID (globally unique identifier) to identify the set as a whole and a RUID (relatively unique identifier, e.g., relative within the set itself) for each element of functionality within the set. The set identifier and any other data structures necessary for operating with the chosen RUID item are passed as part of an I/O control call using the filter handle as a parameter. Only a small number of IOCTLs need to be allocated in order to implement a full system of functionality. As implemented, three different types of sets are established depending on their functions, requiring a total of four IOCTLs. Other implementations may use sets in a different manner. The particular IOCTL will signal the handler for I/O control to interpret or use the chosen element (using the RUID) in a certain manner. Furthermore, control flags may be passed with the GUID and RUID to further specify control information.

The first set type is a property set and is used in connection with values or settings found within the driver or on any associated hardware. Examples of such settings would be transfer rate, volume level, etc. One IOCTL is associated with property sets with a control flag differentiating between a "get" property and a "set" property command. In this manner the same data structure can be used to either set or get a particular property with the driver determining the action required based on the IOCTL used. The correct property is identified by the set identifier consisting of its unique GUID and RUID combination.

Method sets are another type of set used and are a set of actions that can be performed by a driver. Only one IOCTL is needed to identify the method set with the correct method to be actuated identified by the unique GUID and RUID combination for the set identifier. Methods are used to control the driver and include such functions as initializing the driver for use, clearing buffers, etc.

Event sets are used for managing events associated with driver processing, such as device change notification, data starvation notification, etc., or any other notification defined by the set that may be useful to a user mode application. Two IOCTLs are used, one for enabling a specified event and one for disabling a specified event, while any data structures necessary for a given event identified by a RUID can be shared whether enabling or disabling the event.

To use a set, an I/O control operation is initiated using the specified IOCTL and reference to a data structure having the set GUID, RUID, and other necessary data (e.g., control flags, data structures, etc.). For example, setting a volume property on a sound card driver would entail an I/O control operation using a property set IOCTL, a control flag indicating a set property operation, the appropriate GUID for the property set having the volume setting, the specific RUID within that set indicates the volume property, and the new volume setting value.

To query the sets supported, by type, an IOCTL for a particular set type (e.g., property IOCTL, method IOCTL, or event enable IOCTL) having a null GUID and control flags to indicate supported set enumeration are issued as part of an I/O command and a list of set GUIDs supported will be returned. To query supported properties, methods, or events within a given set, the set GUID, set type IOCTL, a null RUID, and control flags indicating enumeration of supported elements are used with the I/O operation. A list of supported RUIDs will be returned as a result of the I/O operation. This will allow a third party agent to determine which, if any, optional elements of an implemented set are supported.

The written specification of a set uniquely identified by a GUID allows a documented mechanism that both driver developers and third party controlling agents may use as an implementation guide. The third party developer will know of a given driver's capabilities based on response to queries and preprogrammed knowledge based on the abstract set definition. Likewise, a driver developer may use the abstract set definition as a guide to implementing a set or group of sets providing known functionality to any third party agent.

In order to provide the connection abilities described herein, a compliant driver must support certain sets. The following tables illustrate some important kinds of information that may be supported in property set format and that can be used in implementing the present invention. The first table refers to properties about a connection pin factory that would be implemented by a filter, while the second table refers to properties about an actual connection pin instance that would be created by using a particular connection pin factory as a template.

TABLE 1

Filter Properties and Their Use

| Property | Description |
| --- | --- |
| Connection Pin Factories | Lists the different types of connection pin instances that may be created on a particular filter, each distinguishable type referred to as a pin factory. Note that this is not the total number of connection pin instances which could be instantiated on this device, but the number of unique connection pin types, such as an audio input and audio output. |
| Connection Instances | Lists the number of instances already created of a given connection pin factory as well as the highest number of instances supported for that particular connection pin factory. If the total cannot be determined until the filter is actually connected, this property will return a -1. |
| Data Flow | Lists the possible data flow direction of a connection pin factory with respect to a filter (e.g., into the filter, out of the filter, or either into or out of the filter). |
| Communication | Lists the communication requirements for a given connection pin factory in terms of processing IRPs. Some connection pin factories may not be interconnected but have other forms of control mechanisms associated therewith such as a "bridge" to a file source for data that represents a source point on a graph. The bridge control mechanism would allow setting of a filename indirectly where information is stored<br>In an exemplary implementation, an agent (which decides which pin factory to use for making a connection pin instance) must be able to understand the intrinsic meaning of a "none", "sink" or input, "source" or output, "both," and "bridge" communication types for a |

TABLE 1-continued

Filter Properties and Their Use

| Property | Description |
|---|---|
| | connection pin factory. For example, a source connection pin instance requires a handle or reference to a sink connection pin instance, etc.<br>In the communication type context, sink and source refer to the disposition of the connection pin instance in processing IRPs. A sink would receive the IRPs for processing, while a source would pass the IRPs onto the next appropriate processing component. There are two communication types that are neither sink nor source and represent end points in the connection graph. An end point represents the place where data either enters or exits from the connected filters. A none designation indicates that the connection type may not be instantiated while a bridge communications type refers to an end point that my be instantiated so that specific properties may be manipulated. For example, a bridge end point that is part of a file reader will likely have a property that will contain the path and file name of a file that stores the data to be processed. |
| Data Ranges | Lists the possible data ranges that a connection pin factory may support, including the format of the data, if relevant. In one implementation, a count followed by an array of data ranges, which the connection pin type may support, is used as part of the property. In that implementation, if different data ranges are supported under different mediums or interfaces (see below), different connection pin factories are available on a particular filter to accommodate such differences. Furthermore, each data range structure may be extended for format specific detail such as number of bits and channels.<br>The actual data format a connection pin instance uses is set during creation of the instance. The data range property is used to assist in determining what that actual data format should be for a particular connection pin instance and is accessed or queried by a third party controlling agent. |
| Interfaces | Lists other set GUIDs indicating the supported interfaces on a particular connection pin factory. An interface is the type or types of data that may be communicated through a connection pin factory. For example, MIDI data, CD music, MPEG video, etc., would be interfaces in the sense that data has a particular convention and format that a filter could handle. Such interfaces also comprise protocols for submitting the data. An interface is independent of the medium by which it is communicated. |
| Mediums | Lists the supported mediums on a particular connection pin factory. A medium is the way or mechanism by which information is transferred, such as IRP-based, sockets, etc. An interface may be defined on top of a variety of different mediums. In the preferred embodiment and implementation explained herein, an IRP-based medium and file IO- based medium is used. |
| Data Intersection | Returns the first acceptable or "best" data format produced by a connection pin factory given a list of data ranges. This approach is used to allow a third party agent to determine data requirements when chaining different filters together. In one implementation, the data intersection property is used to determine the best data format produced by a connection pin factory given the constraint of a list of data ranges. The list of data ranges may be acquired using the data ranges property on another pin factory that will be connected as explained previously.<br>A third party controlling agent, which has no knowledge of the data type specifics, may use the data range list of one connection pin factory and return the "best" (e.g., first acceptable data format) data format on the current connection pin factory. Although a set of ranges of the two intersecting connection pin factories could be returned, only the best format is returned by the driver. In this manner, the third party controlling agent can apply this "best" data format to the next driver in the graph in order to create a virtual set of connections before actually initiating the creation of connection pin instances and connecting the entire graph of filters together. This allows the controlling agent to assess the viability of a particular filter graph selected by a user and point out potential problems to the user before actually connecting the graph. The data format returned can also be restricted by the formats available given the connections already made on the filter. |

TABLE 1-continued

Filter Properties and Their Use

| Property | Description |
| --- | --- |
| | This property is capable of returning an error if a particular data format cannot be determined until an actual connection is made or if an intersection is dependent on multiple data formats on different connection points. Essentially, intersection information is provided while the property itself will return a data format. |

TABLE 2

Connection Pin Instance Properties and Their Use

| Property | Description |
| --- | --- |
| State | Describes the current state of the connection pin instance. Possible states include being stopped, acquiring data, processing data, being paused or idle, etc. The state represents the current mode of the connection pin instance, and determines the current capabilities and resource usage of the driver.<br>The stop state is the initial state of the connection pin instance, and represents the mode of least resource usage. The stop state also represents a point wherein there will be the most latency in data processing in order to arrive at the run state. The acquire state represents the mode at which resources are acquired (such as buffer allocators) though no data may be transferred in this state. The pause state represents the mode of most resource usage and a correspondingly low processing latency to arrive at a run state. Data may be transferred or "prerolled" in this state, though this is not actually a run state. The run state represents a mode where data is actually consumed or produced (i.e., transferred and processed) at a connection pin instance.<br>More resolution in control may be accomplished using custom properties depending on the purpose of the filter and the underlying hardware. For example, in order to make an external laser disk player spin up, one would set some sort of custom "mode" property specific to that class. Setting this property may also change the state of the device but not necessarily, depending on the effect of the mode. |
| Priority | Describes the priority of the connection pin instance for receiving access to resources managed by the filter and is used by the filter in resource allocation arbitration. This property, if supported, allows a third party controlling agent to indicate the priority placement of the particular pin instance relative to all other connection pin instances of all other drivers which may share limited resources with this particular connection and instance.<br>This priority property may also be implemented to allow an agent to set finer tuning of the priority within a single class of priority. For example, a priority may have certain subclasses associated therewith. If two drivers competing for the same resources have the same priority class, then the subclass priority is used to determine resource allocation between the two drivers. If the subclass priority is also the same, then arbitrarily, the first connection pin instance will receive the resources. |
| Data Format | Used to get or set the data format for the connection pin instance. |

The previous tables are given by way of example and not by limitation, and those skilled in the art will appreciate that many different properties and schemes may be implemented in order to create the connections between different drivers. One important element is the standardization factor so that different driver manufacturers or development groups may create drivers that may be interconnected since they are able to implement the same property sets.

Another useful property set gives topology information for the internal relationships of input and output connection pin factories on a given filter. This information will state the relationship of input pin factories and corresponding output pin factories on a given filter as well as what type of processing happens between the input and output pin factories. Examples of the processing that occurs would be different data transformations, data decompression, echo cancellation, etc. Such information is useful to an automated filter graph builder that will trace a hypothetical connection path using multiple filters before making actual connection pin instances and connections. Essentially, the topology information explains the internal structure of the filter and exposes this through a property set mechanism to inquiries from third party agents.

Therefore, a compliant driver is simply one that implements the designated property set. This allows a third party controlling agent to make queries and settings to the compliant filter once it is determined that a given property set is supported. The overall goal is to acquire enough information on how to connect the differing filters together in order to form a filter graph.

By using the generic set mechanism, a minimum of functionality may be implemented to support a compliant driver but still allow unlimited extensibility. A set may be defined in a written specification that can be independently coded by a multitude of different driver developers to create a system of interoperable and interconnectable drivers as long as particular sets are implemented. Furthermore, the specification can define mandatory properties, methods, and events that must be supported as well as optional properties, methods, and events that can be implemented depending on the driver functions and advanced capabilities. Besides the basic minimum commonality required, driver developers may incorporate additional functionality by defining their own sets and assigning them a GUID.

Figure 7:
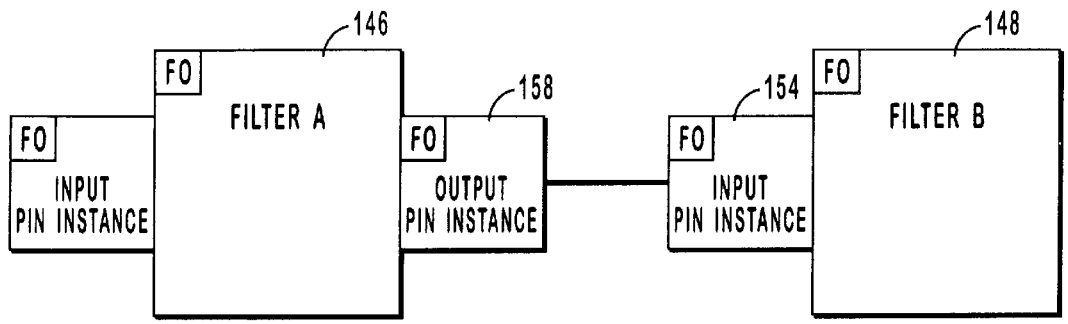
FIG. 7 is a logical diagram showing the horizontal relationship between connected filters utilizing the file object structures in an operating system to effectuate such a connection in a standardized fashion.
Figure 8:
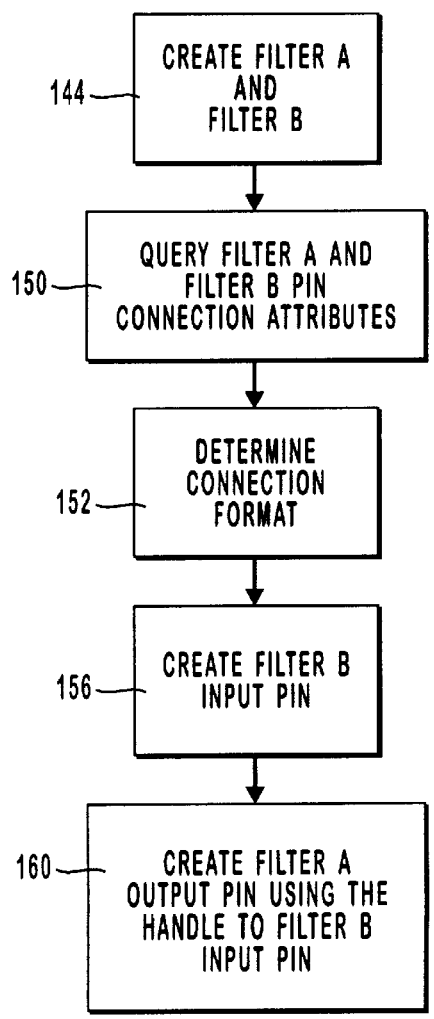
FIG. 8 is a flowchart showing the processing steps taken by a controlling agent in user mode to create and connect the kernel mode filters or drivers of FIG. 7 in order to effectuate a connection for processing I/O requests received from the controlling agent with processing continuing between different drivers (filters).

Referring now to FIGS. 7 and 8, an illustration of the process for connecting two kernel mode filters is illustrated. FIG. 7 shows a logical block description wherein each filter instance and connection pin instance is represented by file objects. FIG. 8 is a flow chart illustrating the steps to creating the file objects and the appropriate connections.

Beginning at step 144, an instance of Filter A 146 and an instance of Filter B 148 are created by a user mode agent. These are created using standard file system API for creating files with a particular device. Filter A 146 and Filter B 148 will be compliant filters or drivers because of their implementing the appropriate property, method, and event sets to support the creation of connection pin instances and for querying the respective filter's capabilities in terms of sets supported and connection pin factories defined for that filter.

The third party controlling agent will then query Filter A 146 and Filter B 148, respectively, at step 150 to determine connection pin factories available and the attributes for connection pin instances that may be created therefrom. These attributes include, as mentioned previously, the connection format and the data format for each individual type of pin instance for each respective filter 146 and 148. The querying will be accomplished using the set based query mechanisms explained in detail previously.

After querying such information, the third party controlling agent will determine the optimal connection format based on the ranges of data formats and connection formats previously queried. This determination occurs at step 152 and places in the third party agent the ability to use the same filters in different ways according to the needs of a selected connection path. The third party controlling agent will use the data intersection property, topology information, and connection pin factories on both the filters in order to determine how best to select data format and connection arrangements depending on the actual filter graph being made.

Input filter pin instance 154 is created by the third party agent at step 156 using the optimal detection formation determined at step 152. Since input pin instance 154 is a file object, a handle will be returned from the create process that can be used for delivering I/O requests to the input instance 154. Furthermore, the creation of the input pin instance 154 was validated and uses the routing and validity mechanisms shown previously in discussion with FIGS. 4A–4C, 5, and 6.

In order to finalize the connection, output pin instance 158 is created at step 160 using as a parameter in the NtCreateFile call the handle of the previously created input pin instance 154. The effect of thus creating the output pin instance 158 is to utilize the system file management and I/O management facilities to create an internal IRP stack structure that allows an original write command to be consecutively processed by the variously connected connection pin instances and filters in an appropriate order so as to facilitate direct data flow between the differing filters. This requires that the input pin instance be created prior to the associated output pin instance that will be feeding the input pin instance.

The stack depth parameter of a device object controls how many stack locations are created for an IRP sent to this driver. A stack depth parameter is assumed to be one when a device object is initially created and may be modified thereafter depending on the whether multiple drivers are chained together. In the current system, modification occurs, if necessary, when an output pin instance transitions from the initial "stop" state to the "acquire" or other state. Connection pin instance state transition is the mechanism that determines correct stack depth parameter information for proper IRP creation and treatment.

In order to correctly allocate the internal IRP stack structure for a chained set of connection pin instances, it is necessary to transition the connection pin instances out of the stop state in a specified order; beginning with the last input pin instance (in this case input pin instance 154) and working consecutively backwards to an associated (e.g., connected) output pin instance (in this case output pin instance 158). If many filters are chained together, the deepest filter's or bridge's input pin instance must be the beginning point of transitioning and building successively backwards until the initial output pin instance on a bridge or filter is set. In other words, the transition out of the stop state must occur backwards up the chain so that each connection pin instance gets the stack size needed after the previous connection pin instance. Typically, though not necessarily, a connection pin instance transitions from the stop state to the acquire state and for discussion purposes hereinafter transitioning to the acquire state will accomplish the same purpose with respect to stack depth parameter adjustment as transitioning out of the stop state.

Once all pin instances are in the acquire state, stream reads and writes may be issued to the filter graph. It is interesting to note that the system explained herein allows connection of associated input and output pin instances to occur in any order; only the transition from the stop state must occur in bottom up or deepest first fashion. Furthermore, the filter graph is reconfigurable to allow changes to be made after initial creation. When changes are made, state transitions need only occur on those connection pin instances that are in the stop state in order to assure correct stack depth parameter information.

Connection pin factories found on filters represent places where a filter can consume and/or produce data in a particular format. For example, a particular connection pin factory may support a number of different data formats, such as 16 bit 44 kilohertz PCM audio or 8 bit 22 kilohertz PCM audio. As explained previously, the connection pin factories and their different capabilities such as data format can be queried from the filter using the appropriate property set mechanism and the system I/O facilities. Actual connection pin instances are created based on the information received from the pin factories.

In a streaming environment, where a single stream write or stream read operation from a user mode agent will cause successive processing of the data through the connected filters, two main methods for IRP control can be used as part of the native facilities of the NT operating system. First, a separate IRP may be created by each filter and sent to the next filter for processing which will in turn create a new IRP for further processing down the chain. The other method is to use a single IRP and pass it between the successive filters using standard procedures provided for interacting with the I/O manager. If the first method of creating new IRPs for each successive filter in the chain is used, interconnection order between the filters is unimportant since the filter need only know the destination of the IRP in order to call the I/O manager and send the IRP to the designated filter. If an IRP is reused, it is important that the connection pin instance transitions from the stop state be made beginning from the last filter to receive the reused IRP for processing backwards up to the first filter to receive the reused IRP or to the filter that created the IRP for processing.

The current embodiment and implementation of the interconnected kernel mode filters utilizes IRP sharing advantageously to ease complexity in driver development, allow more robust drivers to be created, and provide more efficient processing. The "bottom up" pin instance state transition path will ensure that the proper stack order is created in the IRP processed by the successive drivers and that each driver object has the appropriate stack depth parameter set. Furthermore, the current state of the receiving input pin instance is checked in order to assure that the state transition sequence has been properly followed. For this reason, the communications property of a particular connection pin factory will determine the potential flow direction and aid in properly distributing the state transition of connection pin instances.

When creating an output pin instance (or IRP source), a reference to a file object representing an input pin instance (or IRP sink) on another filter will be passed as part of the NtCreateFile call. The appropriate create handler will be executed as explained previously using the multiplexing dispatch function and device object/file object hierarchy. This create handler will have access to the device object of the filter having the input pin instance (e.g., Filter B 148 in FIG. 7) by way of the input connection pin instance file object (e.g., input pin instance 154). From the device object, the previous stack depth parameter can be read, and the stack depth parameter of the device object for the filter having the output pin instance may be incremented. For example, the device object associated with Filter A 146 will have a stack depth parameter incremented from that of the device object associated with Filter B 148 for the connection illustrated in FIG. 7. This normally occurs when transitioning out of the stop state and IRPs are not forwarded while a connection pin instance is in the stop state.

When a filter processes an IRP, it knows which stack frame or location within the IRP stack to access containing information designated for that particular filter by making reference to and using the stack depth parameter of the associated device object. Furthermore, the current filter will prepare the IRP for the next filter in the processing chain by decrementing the device object stack depth parameter to locate the next filters IRP stack location.

The filter code is responsible for preparing the next location in the IRP stack and for calling the I/O manager to pass the IRP to the next filter as designated. In this manner, the filter may designate which file object representing a particular connection pin instance is to receive the IRP and the associated data for processing. Hence, the standard I/O manager calls such as IoAttachDevice to stack the respective device objects for sequential processing of IRPs are not used.

It is noteworthy that creating a connection between connection pin instances does not imply creating new device objects to represent the connection. A single underlying device object is used to support an instance of a filter and all connection pin instances on that filter. Specific information necessary for proper data processing is kept within the context area of the file object allowing the context information to be preserved while non-page memory use is kept at a minimum. It is also noteworthy that while an IRP-based medium has been illustrated, other mediums for communication between the interconnected filters may be used, such as direct function calls on non-host hardware-to-hardware communication.

Figure 9A:
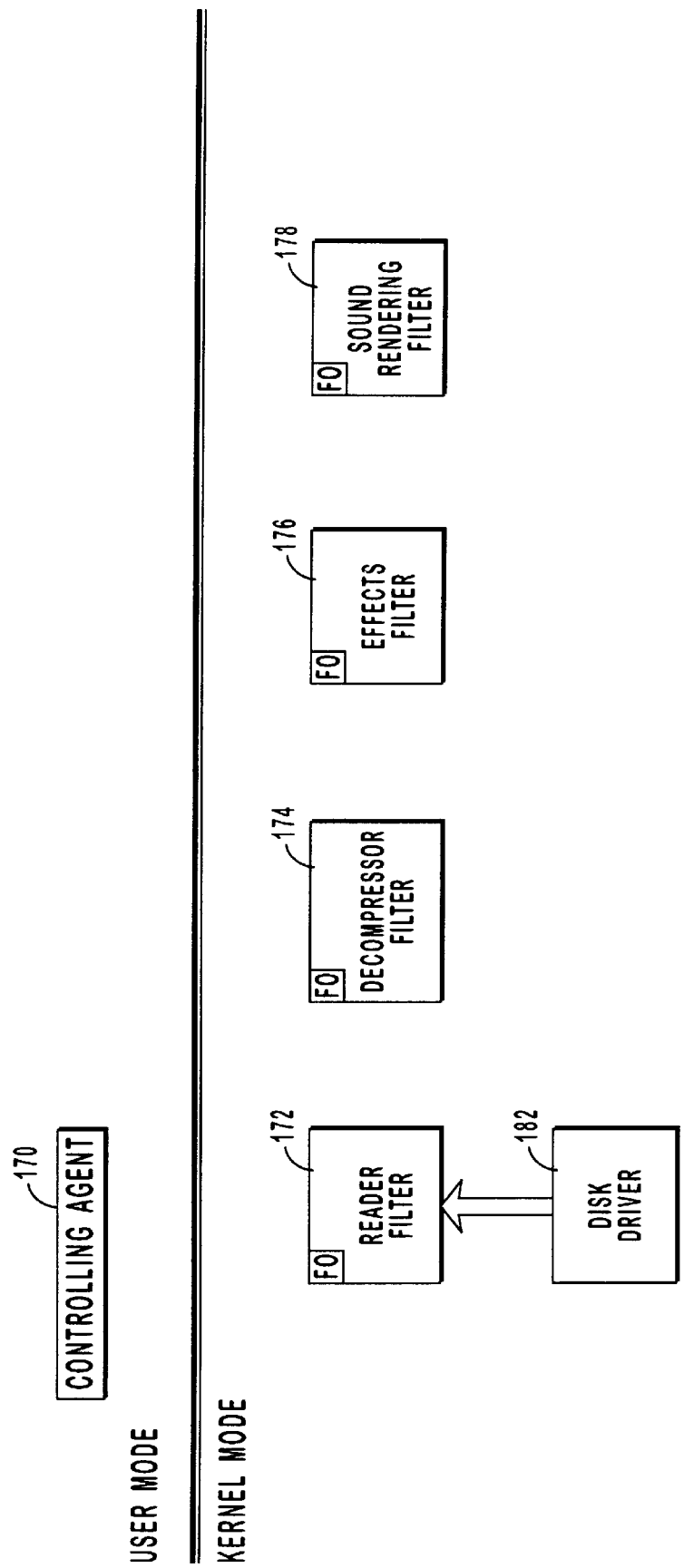
FIGS. 9A and 9B are logical overview diagrams of the kernel mode drivers and connections used to create a chain of kernel mode filters under the direction of a user mode controlling agent to implement a system for reading sound data from a hard drive, processing the data with the kernel mode filters, and rendering the data to be heard through a speaker.
Figure 9B:
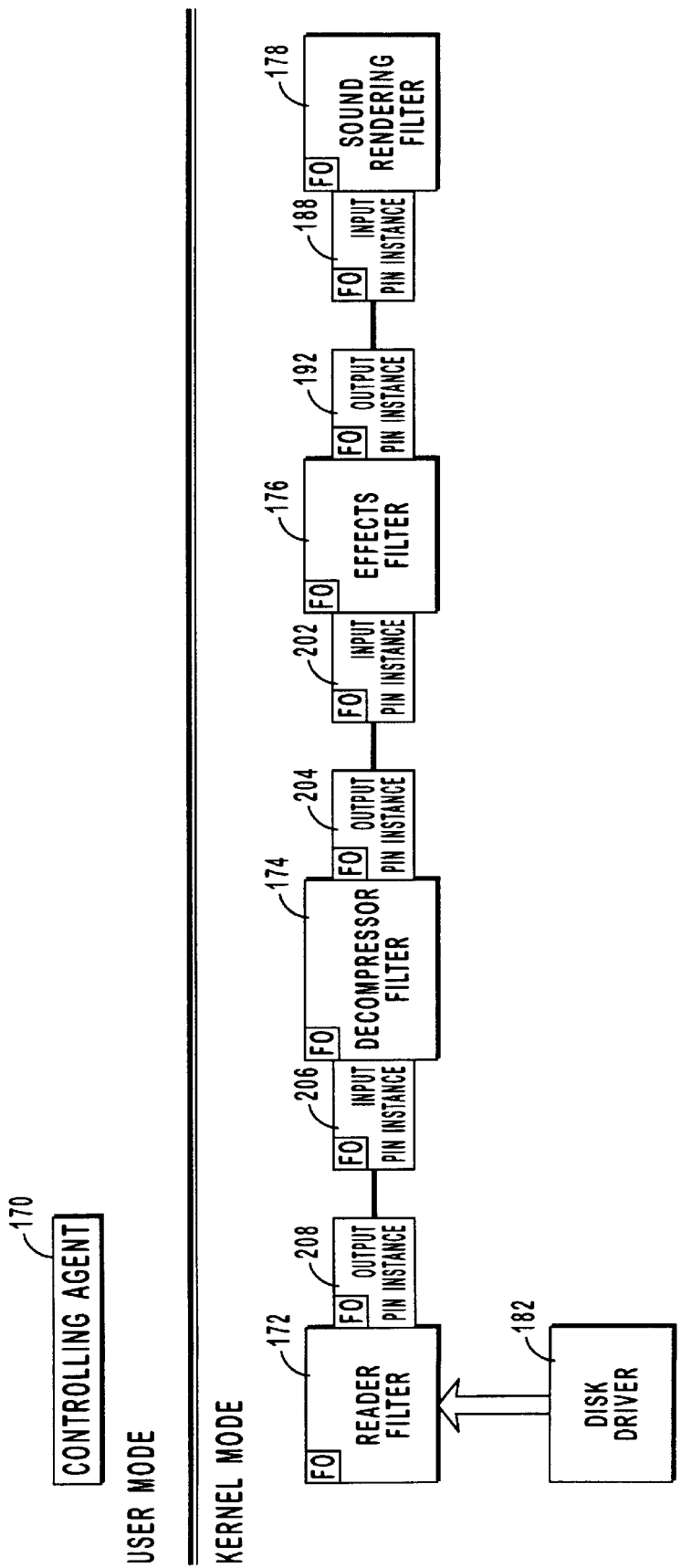
Figure 10:
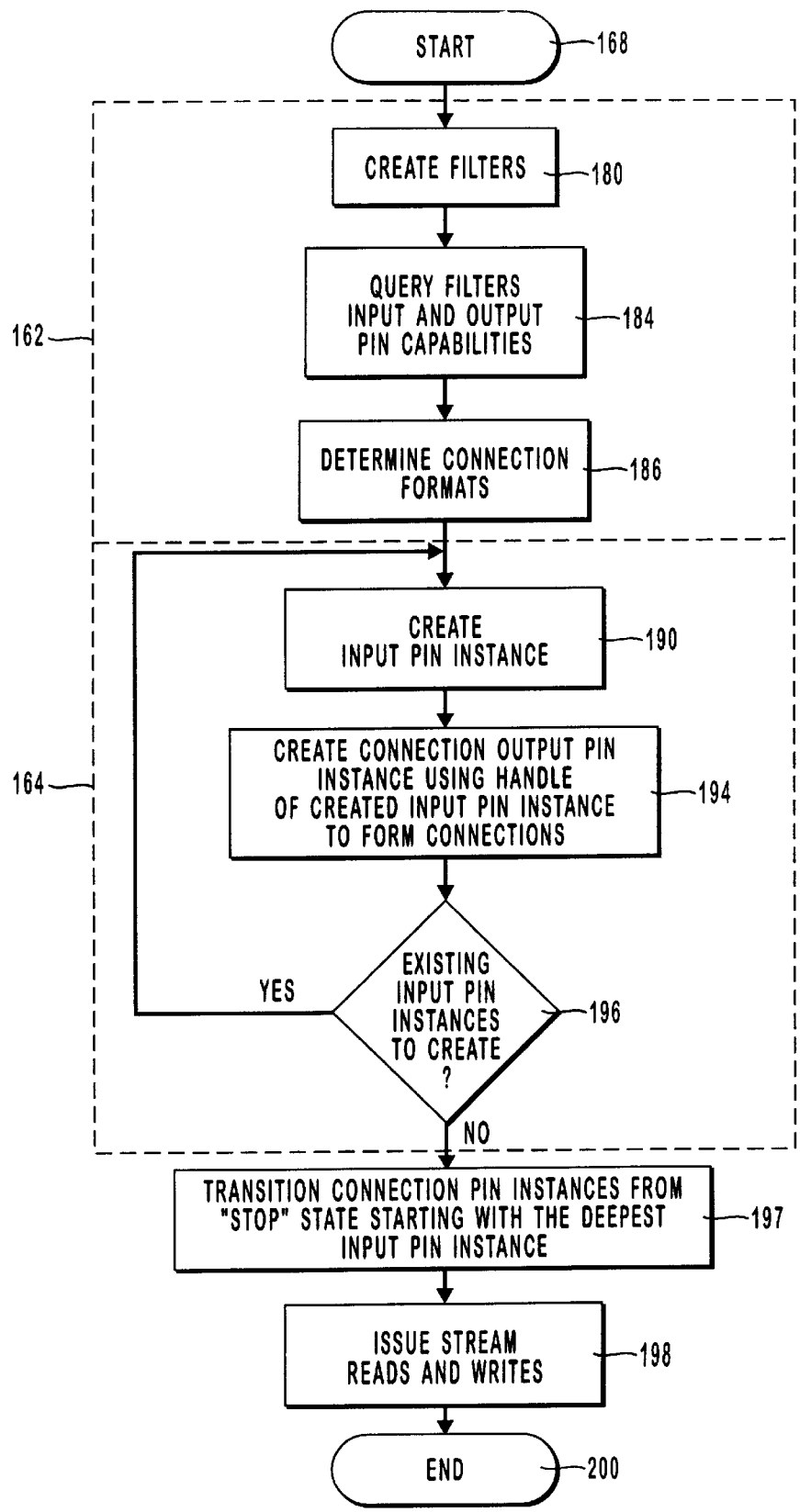
FIG. 10 is a flowchart showing the processing steps for creating the interconnected kernel mode drivers for the system shown in FIGS. 9A and 9B.

Referring now to FIGS. 9A–9B and FIG. 10, the proper creation, connection, and state transition order of the software drivers as shown in FIG. 1 (prior art) and FIG. 2 (higher level logical diagram of the interconnected kernel mode drivers) are presented. FIG. 9A illustrates the logical structure encompassed by box 162 and the processing steps contained therein. FIG. 9B shows the creation of the connection pin instances to complete the interconnection of kernel mode filters and comprises the processing steps encompassed by box 164 on the flow chart shown in FIG. 10.

When in the state of FIG. 9B, having all interconnections made, the kernel mode filter system is ready for reads and writes in order to effectuate processing. The I/O system will use the IRP stack information properly set by the correct state transition process in order to pass the stream reads and writes onto the differing filter elements by way of their respective connection pin instances. It may be noted that some external software other than the agent used to create the graph, including a bridge or filter itself, as well as hardware will provide data for the stream reads and rights.

After beginning at step 168, the controlling agent 170 will create instances of reader filter 172, decompressor filter 174, effects filter 176, and sound rendering filter 178 at step 180. Furthermore, attachment will be made between reader filter 172 and a disk driver 182 in order to bring the data in from off of the disk drive. Creation of each filter instance is achieved by the user mode controlling agent 170 by using standard I/O calls to open a file on the appropriate device as found in the device I/O directory hierarchy. Such a call will return a handle to a file object representing the instance of each filter.

At step 184, the third party agent will query the effects filter 172, the decompressor filter 174, the effects filter 176, and the sound rendering filter 178 to determine the connection pin factory capabilities. These capabilities include what kinds of input and output pin instances may be created, how many instances of each connection pin factory the particular filter will support, the data format supported on each connection pin factory, the medium or type of communication path, etc. The capabilities are "queried" using the property set mechanism explained in more detail previously and the kernel mode filters are presumed to be compliant to the architecture since they support appropriate "sets" (e.g., property set).

All such query information at step 184 will be used to determine if a chained connection path is possible between the respective filters by creating and connecting the appropriate connection pin instances. The third party agent will determine the types of pin instances needed for interconnection in order to make a filter graph to accomplish a given purpose.

The determination of the connection format based on the supported data formats is determined at step 186. Using the topology information, data format, and data intersection properties on the filter, a hypothetical filter graph may be created. Since connection order is not significant, this need not be done but could save time when trying to build a filter graph. Should this hypothetical filter graph be created without error, the third party agent will be assured that creating an interconnecting connection pin instances can be done with reliability. Because some queries will return errors unless an actual pin instance is created, it may be necessary to create such connection pin instances before a hypothetical filter graph can be created that will return a reliable indication of viability. Again, the hypothetical filter graph may be tested before any interconnections take place.

Once the correct connection information is known, as determined at step 186, the input pin instances may be created and interconnected and as represented by the loop of processing steps enclosed by box 164 on FIG. 10. This loop contains processing steps that will begin at the input pin instance furthest away from the source of the data stream. This last input pin instance is referred to as the "deepest" pin instance and may be created first, followed by the output pin instance associated therewith. A connection, therefore, is the creation of an output pin instance using the handle of a previously created input pin instance.

The pattern continues, with every input pin instance created successively afterwards prior to connection with the associated output pin instance. Such a connection scenario is given by way of example and is not to be limiting of other possible ways of connecting the respective output and input pin instances to form a connection between kernel mode filters according to the present system. The filters may be connected in any order according to implementation as long as the handle from the input pin instance is used during creation of the connected output pin instance on another filter. Furthermore, as explained previously, changes may be made to the filter graph after initial creation (and even use).

In the first iteration of the loop, input pin instance 188 will be created at step 190. After receiving the handle from the create function, the third party controlling agent 170 will use that handle as a parameter in an NtCreateFile call in order to create output pin instance 192 at step 194. By doing this through the first iteration, the sound rendering filter 178 is effectively connected to the effects filter 176 through the corresponding connection pin instances 188 and 192, respectively. In the current implementation, the NtCreateFile call is "wrapped" as part of a function call in an API made available to the user mode clients. This relieves the user mode developer of third party agents from needing to know as much detail and allows all relevant functionality be concentrated in a single user mode API.

At step 196, the third party agent determines if there is any other existing input pin instances to be created. If there are, an input pin instance must be created followed by the corresponding output pin instance on another filter. Eventually, all connections will be made and the third party controlling agent 170 will prepare the filter graph for streamed data processing.

In this fashion, input pin instance 202 will be created on the second iteration of the loop enclosed in box 164 at step 190 while the output pin instance 204 will use the handle of input pin instance 202 as part of its creation at step 194. Finally, on the third and final iteration for this particular example, input pin instance 206 will be created followed by output pin instance 208 to finalize the connection.

At step 197, the third party controlling agent 170 will transition each connection pin instance from the stop state to the acquire state in preparation for streamed data processing through the filter graph. To correctly set the stack depth parameter in each of the device objects for the respective filters, it is necessary to make the state transition beginning with the "deepest" or last connection pin instance (e.g., the last input pin instance to receive data for processing) and sequentially moving "up" the chain of interconnected kernel mode filters until arriving at the first connection pin instance (e.g., the first output pin instance that will provide data into the graph). The first filter or bridge will create the IRP with enough stack locations allocated so that the IRP may be passed successively through each kernel mode filter in the graph in an efficient manner.

Finally, the third part controlling agent 170 issues the stream reads and writes in order to process the data at step 198 before ending at step 200.

As explained previously, each creation of an output pin instance will require the handle of a file object representing the input pin instance to be connected thereto. This file object reference will allow the create handler for the output pin instance to save a reference to the device object corresponding to the input pin instance for current or future access.

More particularly, this allows the stack depth parameter of the device object managing the input pin instance to be accessed by the driver of the output pin instance during state transition from the stop state to the acquire or other state. The value of the stack depth parameter associated with the input pin instance is accessed, incremented, and saved into the stack depth parameter for the device object corresponding to the output pin instance.

The stack depth parameter is used to determine where in the shared IRP stack structure the stack frame information is located for a particular filter and will be different for each filter. By so interconnecting the filters and making the state transition in proper sequence, a single IRP may be passed down the chain of interconnected filters in kernel mode with no necessary communication into user mode.

It may be noted that it is possible to have multiple instances based on the same connection pin factory. For example, an audio mixing filter may mix multiple input pin instances into a single output pin instance in terms of processing. Each input instance is of the same type and the filter may only support one type of input pin. Such an arrangement would also be an example of having multiple inputs to a single output.

The converse is also true wherein a splitter filter may have a single input connection pin instance while providing multiple output pin instances thereby multiplying streams of data. Those skilled in the art will note that many variations and useful combinations can be made from the connection mechanism explained herein according to actual implementation and the needs thereof.

The uniformity and standardization achieved by requiring all compliant filters to support a common mechanism (e.g., property sets, methods sets, and event sets) that can be independently implemented by driver developers allows a controlling agent to conveniently connect compliant filters provided by various different software providers. Furthermore, many of the facilities in terms of connection pin factories needed in one circumstance may not be needed in another circumstance. A determination of the necessary connection pin instances is made initially by the third party controlling agent that makes the actual interconnections between different filters.

Figure 11A:
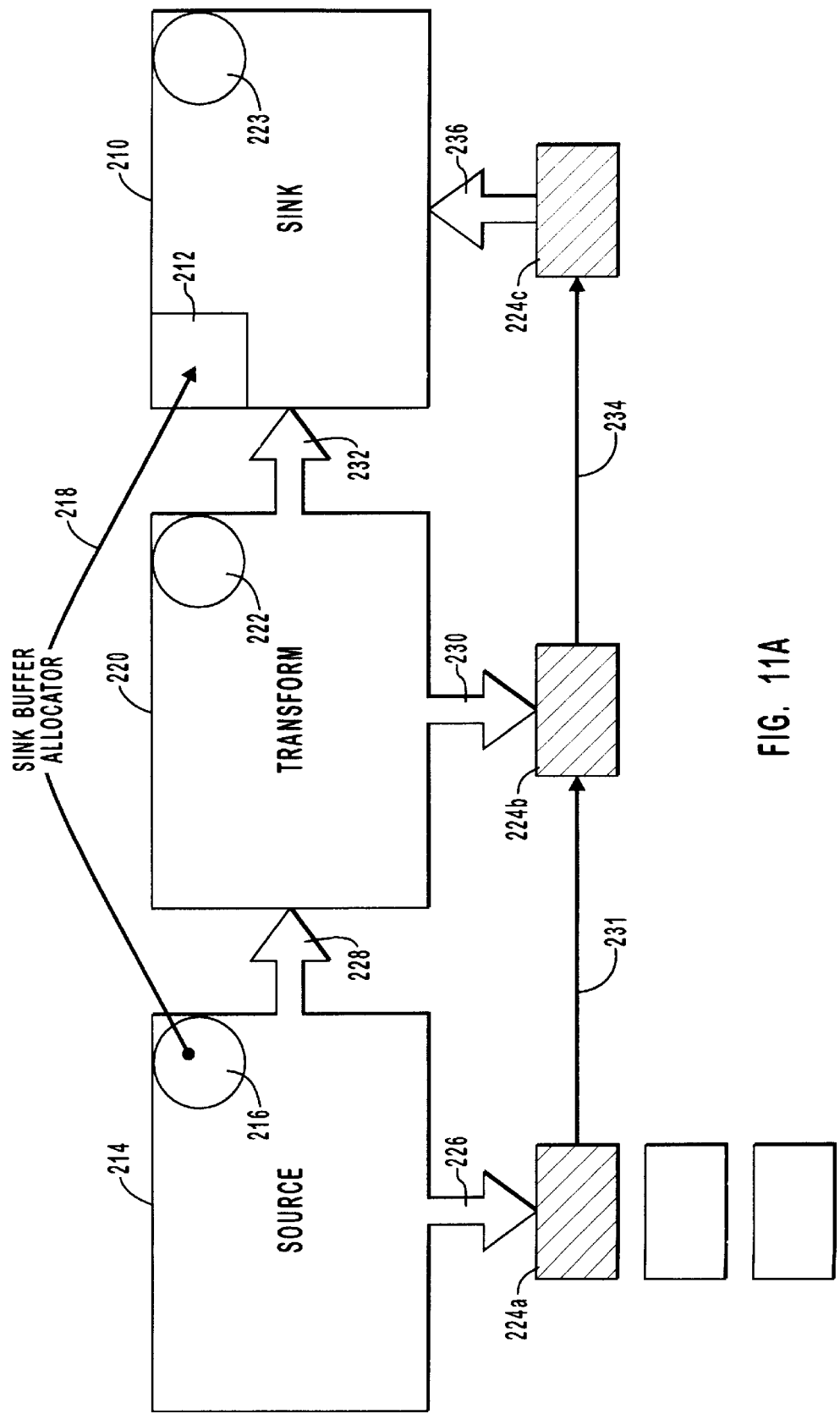
FIGS. 11A and 11B illustrate the functioning of a buffer allocator mechanism.

Referring now to FIG. 11A, operation of a buffer allocator mechanism is shown as used between multiple processing components. Also shown is the data flow (i.e. actual data transfers between buffer frames) between buffers associated with particular processing components. While control will pass to each processing component, data will be transferred only when necessary with some processing components performing their data manipulations and returning the data to the existing buffer frame. In other words, data may be processed in the same location without being transferred to a new buffer and is said to be processed "in place."

A sink processing component 210 will have a buffer allocator mechanism 212 (represented by a square) as part of its functionality. A buffer allocator mechanism will only be present in processing components where it is necessary to ensure certain placement of the data into specific memory such as on board memory on a sound or video processing card or where the previous buffer has unacceptable characteristics, such as byte alignment, frame size, etc. Furthermore, references to the buffer allocator mechanism to be used for allocating frames of buffer memory is indicated by a circle and all processing components will have such references. Note that the source processing component 214 has a buffer allocator reference 216 that references the sink buffer allocator 212 as represented by arrow 218. Furthermore, the transfer processing component 220 has a null buffer allocator reference 222 and the sink processing component 210 also has a null buffer allocator reference as indicated by the empty circle 223.

In this simple processing example, the source processing component 214 allocates a buffer frame 224a by using the sink buffer allocator 212 and accessed using buffer allocator reference 216. The allocated frame 224a is filled with data by the source processing component 214 as represented by arrow 226. It may be noted that the source processing component may perform some data manipulation or transformation before writing the data into the newly allocated frame 224a.

At this point, the source processing component 214 has finished processing and turns control of processing to the transform processing component 220 as represented by arrow 228. The transform processing component 220 will do no buffer allocation or transferring of data from one buffer to another since no buffer allocator mechanism is indicated since buffer allocator reference 222 reference has a null value. Therefore, the transform processing component 220 performs an "in place" data transformation in the allocated buffer frame 224b as represented by arrow 230.

Since the data has not been transferred to a new buffer frame, buffer frame 224a, frame 224b, and frame 224c are the same frame and are simply passed in succession to different processing components. Arrow 231 represents passing the allocated frame between source processing component 214 and the transform processing component 220.

Finally, the transform processing component transfers control of processing to the sink processing component 210 as represented by arrow 232. It may be noted that along with processing control, the same frame is passed for processing as shown by arrow 234 between the frame 224b and 224c. Again, as depicted herein, frame 224a, frame 224b, and frame 224c are all the same frame allocated originally by source processing component 214 and are shown separately for illustration purposes.

The sink processing component 210 will finish processing the data and free the allocated frame 224c within a buffer as presented by arrow 236. Since the sink component 210 is no longer using the buffer, the arrow 236 points inward to the sink processing component 210 and the frame may now be deallocated or reused.

Figure 11B:
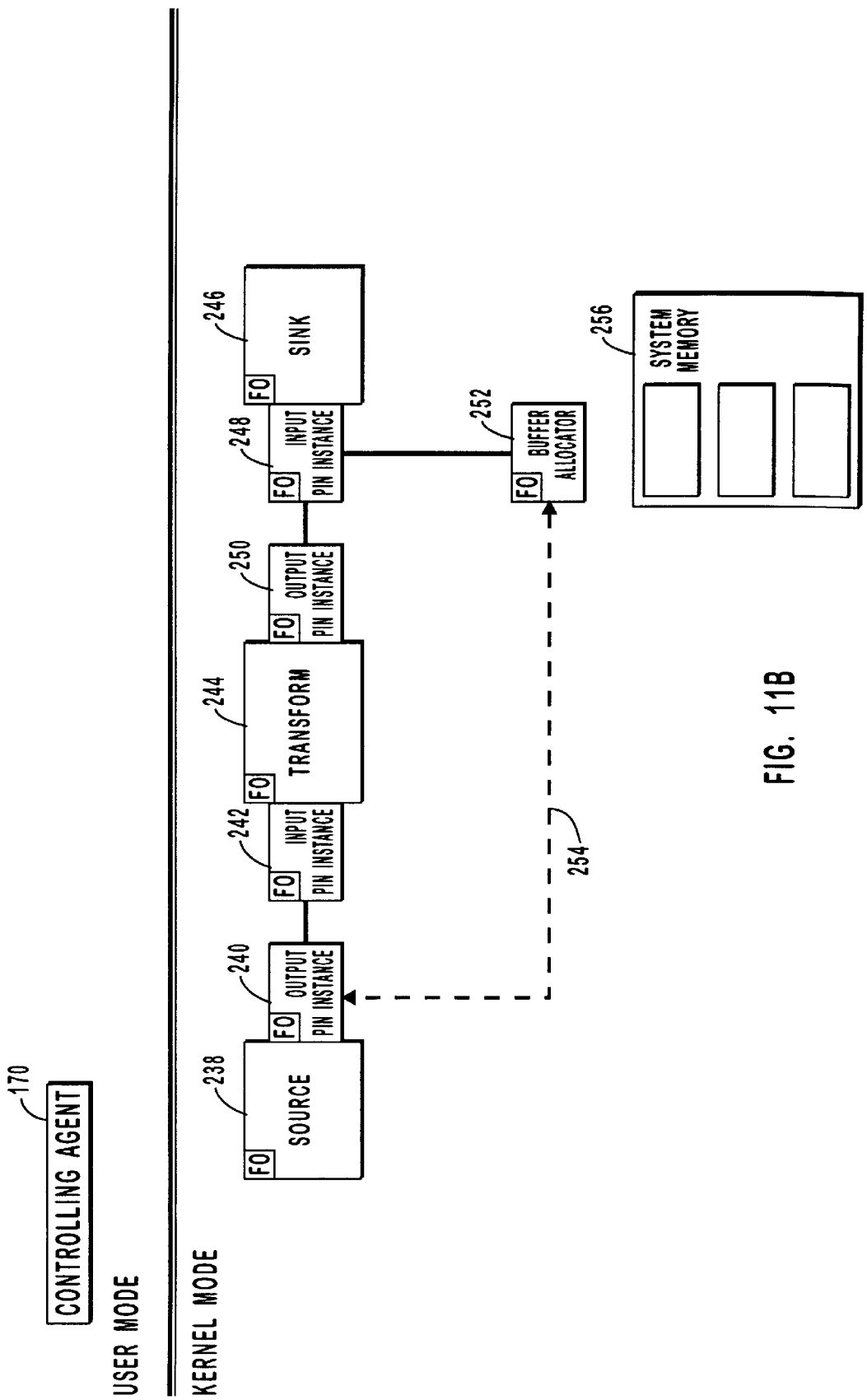

FIG. 11B shows how a buffer allocator mechanism would be logically implemented in the scheme of interconnected kernel mode buffers that has been explained previously. FIGS. 11A and 11B both represent the same filter graph topology and are used to better illustrate operation of the buffer allocator mechanism. The relevant drivers and portions thereof each have access points that allow user mode clients to control the driver and are represented by file objects. Intercommunication occurs using IRPs (whether created by kernel mode drivers or by the NT executive in response to user mode I/O operations).

An instance of source processing component 238 (represented by a file object) has associated therewith an output pin instance 240 (also represented by a file object) that provides a source of connection to another filter instance. An input pin instance 242 that is a "child" of a transform filter 244 was created having a reference to the output pin instance 240 in the manner explained previously in more detail. In like manner, a sink filter 246 having an input pin instance 248 is connected to an output pin instance 250, that is related to the transform processing component 244.

In the system of interconnected kernel mode software drivers, a buffer allocation mechanism is related to input pin instances and is said to be created or formed on the input pin instance. Furthermore, output pin instances will logically have reference to a buffer allocation mechanism, if necessary, and the filter having the output pin instance will utilize that reference to make any buffer frame allocations and data transfer to new frames prior to turning control to another processing component. As explained, a null reference will indicate that no data transfer to a new frame is necessary and that processing may occur in the existing frame, (i. e., after processing, the data is returned to the same buffer frame). Whether a buffer allocator reference is present is determined by the initial negotiation of the third party controlling agent that created the filter graph.

The buffer allocator mechanism formed on an input pin instance 248 is represented by a file object while the dashed line 254 shows that the output pin instance 240 has reference (e.g. a pointer or handle) to the file object representing the buffer allocator 252. In the example shown in FIG. 11B, frames of memory are allocated from system memory 256.

Since the filters may be interconnected in a number of different ways, a buffer allocator though available, may not be necessary. A file object representing an instance of a buffer allocator will only be created should the third-party controlling agent interconnecting the filters determine that it is necessary. In this manner, filters may flexibly be connected in a variety of configurations and still maintain optimal data transfer characteristics. Furthermore, default system buffer allocators can be provided to further reduce the development effort of driver developers.

A third-party controlling agent will also query buffer requirements of connection pins as part of creating a hypothetical model before making actual filter connections. While some implementations may allow queries before pin instantiation, the present embodiment requires that the actual connection pin instance be created before the buffering requirements can be ascertained. Furthermore, the exemplary embodiment disclosed throughout is queried through use of the set mechanisms explained previously.

When a third party client or controlling agent completes the interconnections of kernel mode filters to make a filter graph, it then initiates negotiation of allocator requirements using the handles of the input pin instances (or sink pin instances). By convention, the input pin instances define buffer allocation requirements and provide a buffer allocation mechanism while the output pin instances have reference to any appropriate buffer allocation mechanisms associated with the input pin instances. Those skilled in the art will understand that other conventions may be used to effectively accomplish the same results including reversing the buffer allocation responsibilities between the input and output pin instances.

Buffer allocation requirements are ascertained by using a particular property set mechanism that will be supported by all compliant filters. It may be noted that the "buffer allocator" property set may be organized in a number of different variations as may any other set. For example, the property set may have a single property wherein the property is a data structure having segmented information or the property set may have multiple properties, one for each distinct framing requirement element. A single property composed of a data structure is more efficient in some circumstances since fewer property set queries are necessary by the third party controlling agent in order to retrieve all the framing requirement information. Furthermore, a single data structure could be used not only to query requirement information but also for specifying parameters when an actual buffer allocator is created.

The table below shows a non-exhaustive list of framing requirement elements that may be included in a data structure or as individual properties. Also included is an explanation of how such an element would be used in an exemplary embodiment.

TABLE 3

Buffer Allocator Framing Requirement Elements

| Element | Description |
| --- | --- |
| Control Options (Create) | This element contains control options that are specified during buffer allocator creation on a given connection pin instance. Some options include:<br>System Memory: This control option indicates the use of system memory for buffer frame allocations. When specified, the buffer allocator must allocate memory from the pool (as specified in the allocation pool type element) located in system memory. If this control option is not specified, it is assumed that the input connection pin instance (or sink pin) provides a system address mapping to on-board RAM or other form of storage on a device attached to the system. Such a device may be an add in card, a PCMCIA card, etc.<br>Downstream Compatibility: This control option specifies that the allocator framing elements of the buffer allocator being created are compatible with the downstream allocator. This option is normally specified when an in place modifier is assigned an allocator for copy buffers. If the filter is not required to modify a given frame, it may submit the frame to the downstream filter without allocating an additional frame from the downstream allocator. |
| Requirements (Query) | This element contains the allocator requirements for a connection pin instance (input or sink) that are returned during the query of a connection point. Some potential requirements include:<br>In-place: This indicates that a connection pin instance has indicated that the filter may perform an in-place modification. Otherwise, a buffer must be allocated for receiving the modified data.<br>System Memory: The connection pin instance (input or sink) requires system memory for all buffer frame allocations. If this requirement is not set, it is then assumed that the connection pin instance provides a system address mapping to on-board RAM or other form of storage on a physical device.<br>Frame Integrity: This requirement indicates that the connection pin instance requires that downstream filters maintain the data integrity of specified frames. This may be used when statistics are required of a previous frame in order to properly process the current frame.<br>Allocation Required: This requirement mandates that connection point must allocate any frames sent.<br>Preference Only Flag: This requirements flag indicates that the other requirements signalled are preferences only. This means that the requirements indicate a preferred way of operation but the connection point will still operate correctly and process frames which do not meet the specified requirements. |
| Allocation Pool Type | This element determines the allocation pool type from which kernel mode entities will receive system memory for buffer frame allocation. |
| Outstanding Frames | This element indicates the total number of allowable outstanding buffer frames that can be allocated. In this manner, the total size of the buffer can be controlled. Furthermore, specifying a zero for this element indicates that the filter (through a particular connection pin instance) has no requirement for limiting the number of outstanding frames. |
| Frame Size | This element specifies the total size of a buffer frame. Again, specifying a zero for this element indicates that the filter (through |

TABLE 3-continued

Buffer Allocator Framing Requirement Elements

| Element | Description |
| --- | --- |
| | a particular connection pin instance) has no requirements for this member. |
| File Alignment | This element specifies the alignment specification for allocating frames on certain boundaries. For example, an octal byte alignment may be specified. Furthermore, in the exemplary embodiment, the minimum alignment capability is on quad boundaries providing optimal data access speed on current PC hardware architectures. |

Those skilled in the art will appreciate that there may be other relevant framing properties that may be included. Furthermore, the buffer allocation mechanism as described herein functions in substantially the same manner regardless of whether more buffer frame elements than specified in Table 3 are included or whether a subset of those specified are implemented.

When the filter graph requirements have been determined by the third party controlling agent, then the appropriate kernel mode buffer allocators may be created on the appropriate input connection pin instances. The client creates a buffer allocator instance using the handle of the appropriate connection pin instance and by specifying the appropriate creation parameters for the buffer allocator. In this manner, the resulting file object that represents a buffer allocator will be a child of the connection pin instance and will use the context information from that file object and the file object representing the instance of the filter itself for its proper creation.

In other words, the same mechanism explained previously for validating creation of a connection pin instance and for routing messages to the appropriate handlers for a given connection pin instance will apply in like manner to the creation of an instance of a buffer allocator. Again, the NtCreateFile call will be wrapped in a higher level function call as part of an API that third party controlling agent may use.

Buffer allocator instances will be created, if at all, only on input pin instances in the presently explained embodiment. If a buffer allocator instance handle is not specified to an output connection pin instance handle through an appropriate API call, then the filter can assume that the stream segment submitted via stream I/O controls meet the filter's requirements and it may freely modify the data in-place.

A system supplied default allocator may be used by filter developers to simplify the task of providing buffer allocation capabilities to input connection pin instances. The default allocator provides for a system memory buffer frame allocation for those device drivers that are able to transfer data from system memory but require specific memory allocation properties. By using the default buffer allocator, a filter developer is relieved from the task of actually providing code to do the buffer allocation. The filter will still be written, however, to support the buffer allocation requirements request by supporting an appropriate property set.

To use the default allocator, the filter designer will (1) provide code to respond to the buffer allocation requirements requests, and (2) place a default allocator creation handler reference in the validation table of the particular connection pin instance to which the default allocator pertains. In other words, when a create request for the allocator type mechanism is submitted through the filter, a specific GUID string is matched in the validation table that in turn allows access to the default allocator creation handler.

The default buffer allocator uses system memory and will operate in accordance with the buffer allocator framing properties submitted as part of the creation request. Such a default allocator is likely to be used by various transform filters depending upon their particular function and interconnection order.

Filters requiring buffer allocators for on-board memory or other device dependent storage methods can provide a specific buffer allocator by supporting a buffer allocator property set and method set. For a filter specific allocator, the filter will be responsible for providing program code to implement the entire functionality. The operation of the buffer allocator, however, will be the same as for every buffer allocator, whether default or filter specific, so third party agents may interconnect the filters and buffer allocators properly.

The file object representing the buffer allocator, when successfully created, has contained in the file context area a pointer to a data structure. This data structure will contain a dispatch table for directing IRPs to designated handlers based on the various IRP codes (e.g. create, I/O control, etc.) as well as other data areas and structures for maintaining the state of the buffer allocator. Some implementation dependent information that may be tracked includes reference to the file object of the connection pin instance to which the buffer allocator pertains, reference to an allocation framing requirements data structure, an event queue of those clients waiting for events, a queue of those allocation requests (received by an IRP, for example) that are outstanding, etc.

There are two interfaces, or ways of communicating, available to the buffer allocation mechanism disclosed herein in the exemplary embodiment. First, all allocators must provide the IRP-based interface in order to communicate properly with user mode clients. Optionally, if the allocation pool type can be serviced at the dispatch level (a raised priority level at which a limited subset of services are available, but at which lower priority tasks are blocked out on that processor) of the operating system, a function table interface may be supported allowing interconnected filters to use direct function calls (during DPC processing) for higher performance. This allows event notifications to be communicated between the interconnected filters without the extra overhead of passing an IRP through the I/O manager, or scheduling a thread of execution and waiting for a context switch.

The IRP-based interface will successively process IRPs in the following fashion. When an allocate request is submitted, the buffer allocator will complete the request and return a pointer to an allocated buffer frame or if all frames have been allocated, the allocator marks the IRP pending and adds the IRP to the allocator's request queue for processing, in approximately FIFO order. Finally, the buffer allocator will return status pending to the caller.

When a buffer frame is made available to the allocator, the allocator attempts to complete the first request in the request queue the for IRP-based interface. Those IRPs that could not be serviced previously will be in this request queue and will be waiting for the newly freed frame for processing. Otherwise, if no work awaits in the request queue, the frame is returned to the free list.

The dispatch level interface using the direct function call table operates in the following fashion. When an allocate request is submitted by making a function call (which may be done during a DPC), the allocator returns a pointer to the frame if one is available or returns null immediately. The kernel mode requester may then wait for a free event notification to know that there is a free frame available. Upon receipt of this notification, the kernel mode requester will attempt the allocate request again.

Note that it is possible for both the dispatch level interface and the IRP-based interface to contend for an available free frame. Also, if there are allocation request IRPs waiting to be completed in the request queue, the allocator must schedule a worker item if the current IRQL is not at the passive level when the caller frees a frame since using the direct call interface implies the possibility of being at the DPC level. Essentially, the waiting queue of IRPs does not find out about the free frame until the worker item has been run.

Furthermore, the buffer allocation mechanism explained herein is adaptable to be used with MDLs (memory descriptor lists) in order to further reduce inter buffer transfers. Such an implementation would allow greater seamless interaction with the system memory facilities of the NT operating system.

Figure 12:
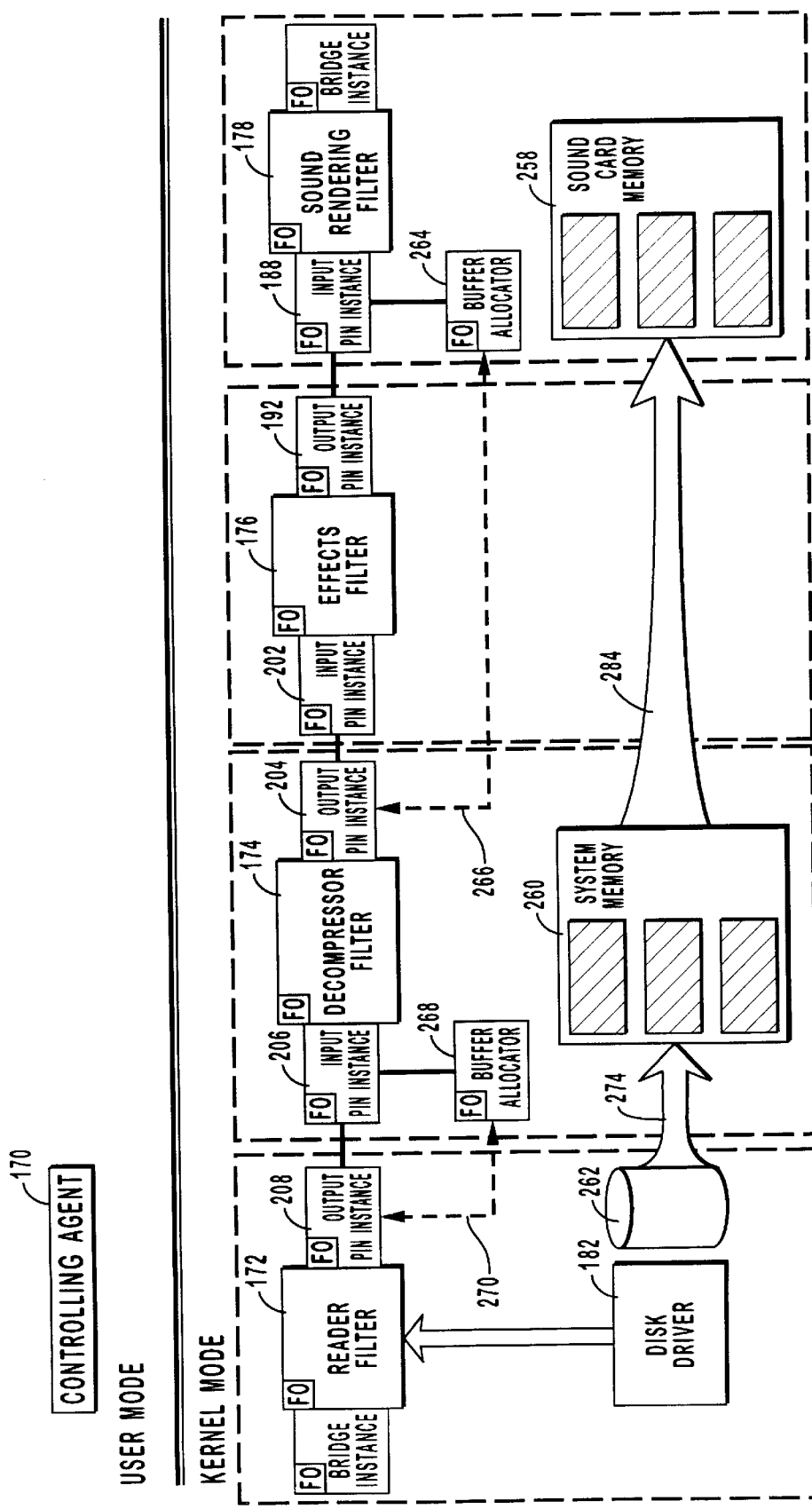
FIG. 12 shows the buffer allocation in transitions of the system illustrated in FIGS. 9A and 9B utilizing buffer allocators for controlling the allocation of buffer frames.

Referring now to FIG. 12, the interconnected filter system of FIGS. 9A and 9B are shown utilizing the buffer allocation mechanism disclosed previously. Once the controlling agent 170 has made interconnections between the filters, it will query each input pin instance for its buffer requirements. As shown herein, the sound rendering filter 178 will need to allocate buffer frames from the sound card memory 258 and the decompressor filter 174 will allocate memory from system memory 260 which may receive the data directly from disk drive 262.

Controlling agent 170 will create a buffer allocator 264 that is represented by a file object and being formed on the input pin instance 188. The buffer allocator 264 will allocate buffer frames from the sound card memory 258 and a reference to the buffer allocator 264 will be set in the output pin instance 204 as represented by dashed line 266. This reference will be the handle to the file object representing buffer allocator 264 and will be used by the decompressor filter 174 to allocate buffer frames as necessary before transferring data to the new buffers.

In like manner, buffer allocator 268 is also represented by a file object and created or formed on input pin instance 206. This buffer allocator 268 will manage allocation of system memory 260. The controlling agent 170, after creating buffer allocator 268, will store a reference thereof in output pin instance 208 as represented by dashed line 270. Again, buffer allocator 268 will be responsible for allocating buffer frames between system memory 260 so that data may be transferred therein from disk 262.

The controlling agent will also put a value of null for the buffer allocator reference of output pin instance 192 to thereby indicate that an in place transformation will occur wherein the effects filter 176 will read the data from the existing buffer in sound card memory 258 and replace the data back into the sound card memory 258 after applying whatever transform or effect is required. Alternatively, if the controlling agent does not set the buffer allocator reference, it will be assumed to have a value of null and in place transformation will occur.

Figure 13:
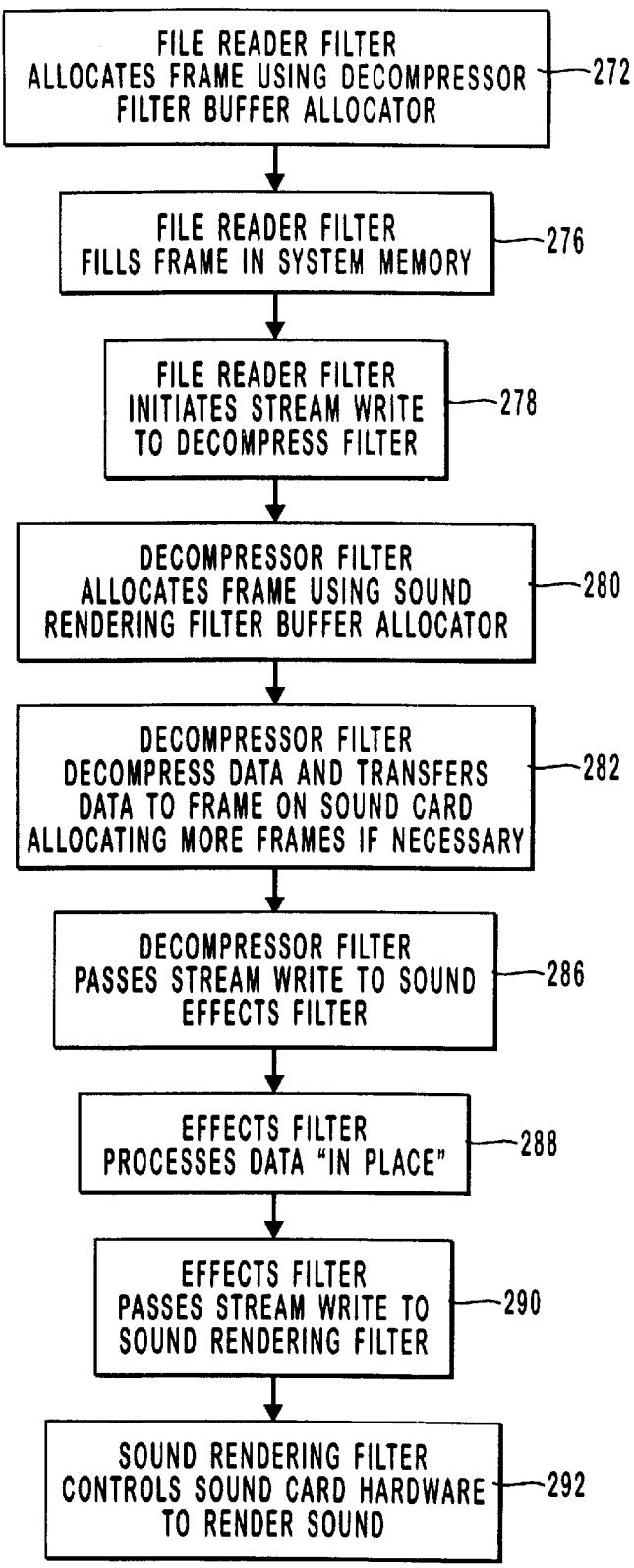
FIG. 13 is a flow chart showing the processing steps for bringing data from a disk driver through a chain of interconnected kernel mode filters and rendering the data on sound processing hardware specifically showing the operation of buffer allocators and the actual data transferring between buffers for the system shown in FIG. 12.

Referring now to the flow chart of FIG. 13 and the logical diagram of FIG. 12, operation of the buffer allocators will be shown. This process occurs after the interconnections are made and the stream reads and writes are given from the controlling agent 170 to the reader filter 172.

Initially, the reader filter 172 allocates a frame in the system memory using the decompressor filter 174 buffer allocator 268 at step 272. The output pin instance 208 of reader filter 172 will have a handle to the file object representing the buffer allocator 268 as represented by line 270, and will therefore have direct access to controlling the buffer allocator 268.

Once the file reader filter 172 has access to an actual buffer frame in system memory 260, it will fill the frame with data from disk 262 as represented by arrow 274 at step 276. It may be noted that the reader filter 172 may make a transformation or other manipulation on the data as it brings it into system memory 260.

The file reader filter 172 then initiates a stream write to the decompressor filter 174 at step 278. This stream write will be passed by way of an IRP through the NT I/O manager. At step 280, the decompressor filter 174 will allocate a frame of sound card memory 258 using the buffer allocator 264. The decompressor filter 174 will have knowledge of the buffer allocator 264 since a handle thereto was stored with respect to output pin instance 204.

The decompressor filter 174 will decompress the data and transfer the data to the frame previously allocated in sound card memory 258 as represented by arrow 284. Note that in decompressing the data there may be more frames allocated from sound card memory than exist in system memory. The extra ratio of buffer frames is necessary to accommodate the decompression effect on the data.

It is important to note that when transferring data from one buffer to another buffer that there may not be a 1:1 correspondence in terms of the amount of data transferred. In other words, the receiving buffer may require more or less space (or frames) depending on the nature of the filtering or transformation that takes place between the buffer transfer.

Once the decompressor filter 174 is finished decompressing a particular frame, it passes the stream write to the effects filter 176 using the facilities of the NT I/O manager. The effects filter 176 receives the stream write IRP at step 288 and processes the data in place in the existing sound card memory 258. Such effects processing would generally correspond to a 1:1 replacement of data requiring neither more or less buffer memory.

Once the effects filter 176 is finished processing the data in place, the stream write IRP is passed to the sound rendering filter at step 290. Again, the mechanism causing the stream write IRP to be transferred to the sound rendering filter 178 is the NT I/O manager facilities called by the effects filter 176.

Finally, the sound rendering filter 178 will receive the stream write IRP at step 292 and control the sound card hardware in order to form the actual rendering of the sound data existing in sound card memory 258. At that point, the sound card buffer frames that had been previously allocated can be reused to service writing requests or freed if there are no outstanding requests. The availability of a buffer frame is made known to the decompressor filter 174 so that any waiting stream writes may be used to process and place data into the freely allocated buffer frames. In like manner, the buffer frames of system memory 260 are either reused or freed.

Those skilled in the art will recognize that the methods of the present invention may be incorporated as computer instructions stored as a computer program code means on a computer readable medium such as a magnetic disk, CD-ROM, and other media common in the art or that may yet be developed. Furthermore, important data structures found in computer hardware memory may be created due to operation of such computer program code means.

The present invention may be embodied in other specific forms without departing from its spirit of essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for interconnecting software drivers to allow efficient kernel mode processing of data and only transferring data between the drivers when necessary comprising the steps of:

opening one or more kernel mode drivers;

forming one or more connection pin instances for connecting the drivers, each connection pin instance hierarchically related to one of said one or more drivers and used for data transmission between said one or more drivers;

creating one or more buffer allocators for providing data storage buffers as needed, each buffer allocator hierarchically related to one of said one or more connection pins and used for allocating buffers and controlling data transfer;

interconnecting said one or more connection pins so as to provide a continuous data flow path through the one or more drivers, the data being transferred from an existing buffer to another buffer only when indicated by a buffer allocator that is associated with an input connection pin of a successive one of said one or more drivers and, if the buffer allocator is not present, the successive driver processing the data in its existing buffer.

2. A method as recited in claim 1 wherein each connection pin instance is represented by a file object and the hierarchal relationship is created by specifying the related driver, the driver referenced as a file object of an I/O device available on the system, during connection pin instance file object creation and each buffer allocator is represented by a file object and the hierarchal relationship with a connection pin instance is created by specifying the related connection pin instance file object as a parent during the buffer allocator file object creation.

3. A method as recited in claim 1 further comprising the step of querying each of said connection pin instances on each of said one or more drivers to determine the buffer requirements required by said connection pin instances in order to determine whether said buffer allocators are necessary for creating buffers prior to interconnecting said one or more connection pin instances.

4. A method as recited in claim 1 wherein at least one of said one or more connection pin instances on said one or more drivers support at least one predefined set of properties, set of methods, and set of events to indicate to a third party component the buffering requirements of the at least one connection pin instance and for allowing a third party component to form said buffer allocator on respective connection pin instances and the respective buffer allocators support at least one predefined set of properties, set of methods, and set of events to control said respective buffer allocators thereby allocating and managing data buffers as necessary as determined by the third party component.

5. A method as recited in claim 1 wherein said interconnecting step comprises, for each pair of interconnected connection pin instances, the steps of:

receiving, by a third party component, a first reference to a first connection pin instance related to a first driver, the first reference including a reference to a first buffer allocator for creating and managing data buffers if present on the first connection pin instance;

receiving, by a third party component, a second reference to a second connection pin instance related to a second driver, the second reference including a reference to a second buffer allocator for creating and managing data buffers if present on the second connection pin instance;

passing said first reference, by said third party component, to said second connection pin instance at said second driver; and passing said second reference, by said third party component, to said first connection pin instance at said first driver, said first and second connection pin instances to transfer data back and forth between connected respective first and second drivers only if there is a reference to a buffer allocator at the respective receiving driver otherwise the receiving driver to process the data at its existing location.

6. A method as recited in claim 1 wherein said interconnecting step comprises, for each pair of interconnected connection pin instances, the steps of:

receiving, by a third party component, a reference to an input pin instance, said input pin instance to receive data for processing at a receiving driver, said reference including a reference to a buffer allocator, if present on said input pin instance;

passing said reference, by said third party component, to an output pin instance, at a sending driver to thereby connect said drivers, said data being transferred to a data buffer under control of the receiving driver only if said reference to an input pin instance includes a reference to a buffer allocator otherwise said receiving driver to process the data in its existing location.

7. A computer-readable medium having computer-executable instructions for performing the steps recited in claim 1.

8. A method of interconnecting a first and second device driver to allow said device drivers to communicate with each other and transfer control for processing data using a kernel mode connection in a standardized and extensible manner and further causing the data to be transferred from an existing buffer to a new buffer only if necessary, the method comprising:

providing, by a third party component, a data format and a connection format to a first device driver;

creating, by said first device driver and in response to said third party component, a first instance of said connection format and a handle to the instantiated connection including a reference to a buffer allocator formed on the first instance of said connection format, if formed thereon;

returning, by said first device driver, said handle to said third party component;

providing, by said third party component, said data format, said connection format, and said handle to said second device driver; and forming, by said second driver and in response to said third party component, a second instance of said connection format utilizing said handle, thereby allowing said first driver to transmit data from said existing buffer to a new buffer entirely within kernel mode through said first and second connection format instances only if said first connection format instance references a buffer allocator that indicates and manages the new buffer, the first driver otherwise passing data processing control only to said second driver to process the data in the existing buffer.

9. A method as recited in claim 8 further comprising the steps:

querying, by a third party component, said first device driver to determine buffer requirements;

supplying, to said third party component by said first driver in response to the query, the buffer requirements and options of the first device driver; and determining, by said third party component based on the supplied buffer requirements, whether to form a buffer allocator as part of the first connection format instance; and forming, if necessary, a buffer allocator on the connection format instance for creating and managing buffers.

10. A method of interconnecting a first and second device driver to allow said device drivers to communicate with each other and transfer control for processing data using a kernel mode connection in a standardized and extensible manner further causing the data to be transferred from an existing buffer to a new buffer only if necessary, the method comprising:

querying, by a third party component, said first and second device drivers for the types of connection supported including, for said first driver, buffering requirements for each connection type and the availability of a buffer allocator for each connection type;

supplying, to said third party component by said first and second device drivers in response to the query, the type of connections each device driver supports including, for said first driver, buffering requirements for each connection type and the availability of a buffer allocator for each connection type;

determining, by said third party component based on the supplied connection information, how to make a connection between said first and second device drivers and whether a buffer allocator need be formed on the connection format for the first driver;

providing, by said third party component, a data format and a connection format to said first device driver;

creating, by said first device driver and in response to said third party component, an instance of said connection format to said first device driver and a connection handle to the instantiated connection;

returning, by said first device driver, said handle to said third party component;

providing, by said third party component, said connection handle and buffer requirements to said first device driver;

creating, if necessary, on the connection instance, by said first device driver and in response to said third party component, an instance of a buffer allocator for creating and managing buffer according to the buffer requirements including a buffer allocator handle to the instantiated buffer allocator;

returning, by said first device, said buffer allocator handle to said third party component; and providing, by said third party component, said connection handle and said buffer allocator handle, if available, to said second device driver to interconnect said first and second device drivers and allow processing control to pass from said second device driver to said first device and to transfer said data from said existing buffer only if said buffer allocator handle is present to indicate a new buffer and if not present, allowing said first driver to process said in said existing buffer.

11. A kernel mode data processing system comprising;

a data source;

a plurality of kernel mode data processing components including an originating component and a terminating component, the originating component reading data samples of a data stream from the data source, each data processing component having connection pins for passing data samples between the data processing components, and some pins having buffer allocators for providing data storage buffers as needed, each buffer allocator hierarchically related to one of said connection pins and used for allocating buffers and controlling data transfer; and kernel mode component interconnections between the data processing components to route the processing of data samples from the originating component to the terminating component, the data samples being transferred from an existing buffer to another buffer only when indicated by a buffer allocator that is associated with a connection pin of the terminating component and, if the buffer allocator is not present, the terminating component processing the data in its existing buffer.

12. A kernel mode media processing system comprising:

a media source;

a plurality of kernel mode media processing components including an originating component and a terminating component;

the originating component reading media samples of a media stream from the media source;

the terminating component rendering said media stream;

each media processing component having connection pins for passing media samples between media processing components; and some pins having buffer allocators for providing data storage buffers as needed, each buffer allocator hierarchically related to one of said connection pins and used for allocating buffers and controlling data transfer; and kernel mode component interconnections between the media processing components created using the connection pins to route processing control of the media samples from the originating component to the terminating component with the media samples transferred from an existing buffer to another buffer only when indicated by a buffer allocator that is associated with a connection pin of the terminating component and, if the buffer allocator is not present, the terminating component processing the media sample in its existing buffer.

* * * * *

UNITED STATES PATENT AND TRADEMARK OFFICE
CERTIFICATE OF CORRECTION

PATENT NO.    : 6,209,041 B1
DATED         : March 27, 2001
INVENTOR(S)   : George H. J. Shaw, Bryan A. Woodruff and Thomas J. O'Rourke It is certified that error appears in the above-identified patent and that said Letters Patent is hereby corrected as shown below:

Column 2,
Line 9, after "drivers" change "to" to -- so --
Line 10, after "run in" change "a" to -- an --

Column 4,
Line 27, after "using the" delete "the"

Column 11,
Line 16, after "by file" change "object" to -- objects --

Column 12,
Line 50, after "containing" change "sting" to -- string --
Line 53, after "will" delete "the"

Column 22,
Line 10, after "on" and before "whether" delete "the"

Column 25,
Line 48, after "functionality" and before "be" insert -- to --

Column 28,
Line 35, after "reference" delete "is"

Column 30,
Line 50, after "that" and before "connection" insert -- the --

Column 35,
Line 19, after "only as" change "illustrated" to -- illustrative --

UNITED STATES PATENT AND TRADEMARK OFFICE
CERTIFICATE OF CORRECTION

PATENT NO. : 6,209,041 B1
DATED : March 27, 2001
INVENTOR(S) : George H.J. Shaw, Bryan A. Woodruff and Thomas J. O'Rourke It is certified that error appears in the above-identified patent and that said Letters Patent is hereby corrected as shown below:

Column 38,
Line 13, after "first device" insert -- driver --
Line 17, after "said" and before "in" insert -- data --

Signed and Sealed this

Sixth Day of August, 2002

Attest:

JAMES E. ROGAN
*Attesting Officer*  *Director of the United States Patent and Trademark Office*